US012771110B2

(12) United States Patent
Gaudynska

(10) Patent No.: US 12,771,110 B2
(45) Date of Patent: Oct. 20, 2026

(54) UNIVERSAL CABLE PORT ENTRY DEVICE

(71) Applicant: CORNING RESEARCH & DEVELOPMENT CORPORATION, Corning, NY (US)

(72) Inventor: Marta Eliza Gaudynska, Lodz (PL)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 196 days.

(21) Appl. No.: 18/626,849

(22) Filed: Apr. 4, 2024

(65) Prior Publication Data

US 2024/0364090 A1 Oct. 31, 2024

Related U.S. Application Data

(60) Provisional application No. 63/461,608, filed on Apr. 25, 2023.

(51) Int. Cl.
*H02G 15/013* (2006.01)

(52) U.S. Cl.
CPC ................................ *H02G 15/013* (2013.01)

(58) Field of Classification Search
None
See application file for complete search history.

(56) References Cited

U.S. PATENT DOCUMENTS 9,022,814 B2 5/2015 Fabrykowski et al.
10,143,868 B2 * 12/2018 Lopes ...................... F16L 5/04
10,371,912 B2 8/2019 Coenegracht et al.
11,899,265 B2 2/2024 Kukian et al.
2006/0037264 A1 * 2/2006 Paetow .................... F16L 5/04 52/220.1
2013/0068487 A1 3/2013 Klein et al.
2013/0307225 A1 11/2013 Boyd
2015/0251028 A1 * 9/2015 Klein .................... A62C 2/065 277/616

(Continued)

FOREIGN PATENT DOCUMENTS

DE 10200970 A1 * 8/2003 ................ F16L 5/04
EP 3176890 B1 3/2020
JP 2002-158463 A 5/2002

OTHER PUBLICATIONS

Extended European Search Report, EP application No. 24171665.3, dated Sep. 27, 2024, 9 pages, European patent office.

*Primary Examiner* — Krystal Robinson
(74) *Attorney, Agent, or Firm* — Kapil U. Banakar

(57) ABSTRACT

A system for sealing cable(s) is provided comprising a first compressible member defining a wall portion and a first groove having a first rounded portion and a first straight portion. A minimum depth of the first rounded portion is less than a depth of the first straight portion, and the depth of the first straight portion is less than a depth of the wall portion. The first compressible member is configured to receive a first cable of the cable(s) in the first groove. The system comprises a second compressible member comprising fingers attached together on one side of the second compressible member. Cuts are formed in the second compressible member, and a respective cut is positioned between adjacent fingers. At least one finger deforms as the second compressible member is compressed, and the fingers at least partially restrict movement of and form a seal around the first cable.

24 Claims, 19 Drawing Sheets

(56) References Cited

U.S. PATENT DOCUMENTS

| | | | | |
|---|---|---|---|---|
| 2017/0335996 | A1* | 11/2017 | Lin | F16L 5/10 |
| 2018/0248350 | A1 | 8/2018 | Coenegracht et al. | |
| 2023/0021038 | A1* | 1/2023 | Paetow | H02G 3/22 |

* cited by examiner

UNIVERSAL CABLE PORT ENTRY DEVICE

PRIORITY APPLICATION

This application claims the benefit of priority of U.S. Provisional Application No. 63/461,608, filed on Apr. 25, 2023, the content of which is relied upon and incorporated herein by reference in its entirety.

FIELD

Embodiments relate generally to a universal cable port entry device and corresponding systems and methods for sealing one or more cables.

BACKGROUND

Other devices have been used in enclosures that attempt to control the positioning of cables and to form a seal around the cables, but these devices frequently have many limitations. The devices often have round cutouts where cables may be received, but such devices often have a limited ability to be used with cables having different sizes. For example, where round cutouts are provided and a large cable and a small cable are used with the same device, the round cutouts will often be too large for the small cables, allowing the small cables to shift within the round cutout and preventing the small cable from having an effective seal. Alternatively, the round cutouts may be too small for large cables, preventing the large cables from being used with the device. Previous solutions required tear-out sections or multiple sealing elements to hold cables having different sizes, adding more costs and making installation more burdensome/complex.

Improvements in the foregoing are desired.

SUMMARY OF THE DISCLOSURE

In various embodiments described herein, devices are contemplated that better conform to the shape of cables therein. In some embodiments, devices described herein are universal cable port entry devices that are configured to receive cables having different sizes. The devices may effectively control the positioning of cables and form a seal around cables. Various example embodiments provide cable sealing devices that beneficially ensure appropriate positioning, tightness and sealing of cables after applying compression in various situations. For example, this may be ensured even where a cable sealing device is used (i) without cables; (ii) with only one cable at a minimum diameter; (iii) with only one cable at a maximum diameter; (iv) with two cables having the same diameter; and (v) with two cables having different diameters.

The devices may include compressible members that compress in differing amounts based on the geometry of cables being used. In some embodiments, both of the compressible members may comprise a foam material. A first compressible member has grooves formed therein, and these grooves have unique geometry that allows the first compressible member to be effective in positioning and sealing cables. Each groove may comprise a first rounded portion and a second portion (e.g., a straight portion). For smaller cables, the cables simply rest in the first rounded portion alone. However, larger cables may be too large in cross-sectional size to fit in the first rounded portion when the first compressible member is not under compression, and the larger cable may be urged towards the first compressible member so that the second portion (which may be referred to herein as the "straight portion"—as it may be straight in exemplary embodiments, but could be other curvatures/angles in other embodiments) deforms in shape to effectively increase the size of the rounded portion thereby, allowing the larger cable to rest therein. The second compressible member has compressible fingers with cuts positioned between the fingers.

The devices may be utilized in various enclosures, terminals, and/or multi-dwelling unit (MDU) terminals. Devices may possess high sealing efficiencies so that enclosures and/or terminals using the devices are better protected from water, moisture, dust, etc. In some embodiments, devices may allow enclosures to qualify as IP55 enclosures and IP65 enclosures as a result of more effective sealing.

The ability to use the device for a wider range of cable sizes may provide various benefits. This ability may reduce the costs that would previously be incurred in obtaining devices with the specific cutout size required for the cables being used. Additionally, systems may be formed with less parts, making installation of systems easier for users. By contrast, with previous systems, individual devices having a cutout for receiving cables were often required for each cable. Additionally, installation may be completed without the need for the installer to tear sections out.

In an example embodiment, a system for sealing one or more cables is provided. The system comprises a first compressible member defining a first surface. A wall portion and a first groove are defined in the first compressible member opposite the first surface. The first groove comprises a first rounded portion and a first straight portion. A minimum depth of the first rounded portion from the first surface is less than a depth of the first straight portion from the first surface, and the depth of the first straight portion from the first surface is less than a depth of the wall portion from the first surface. The first compressible member is configured to receive a first cable of the one or more cables in the first groove. The system also comprises a second compressible member comprising a plurality of fingers. A plurality of cuts are formed in the second compressible member, and a respective cut is positioned between adjacent fingers of the plurality of fingers. The plurality of fingers are attached together on one side of the second compressible member. At least one finger of the plurality of fingers of the second compressible member deforms as the second compressible member is compressed, and the plurality of fingers are configured for at least partially restricting movement of the first cable and form a seal around the first cable between the first compressible member and the second compressible member.

In some embodiments, a second groove is defined in the first compressible member opposite the first surface. The second groove comprises a second rounded portion and a second straight portion. A minimum depth of the second rounded portion from the first surface is less than a depth of the second straight portion from the first surface, and the depth of the second straight portion from the first surface is less than the depth of the wall portion from the first surface. The first compressible member is configured to receive a second cable of the one or more cables in the second groove, and the plurality of fingers are configured for at least partially restricting movement of the second cable and for forming a seal around the second cable. Additionally, in some embodiments, the first cable has a first cross-sectional size, the second cable has a second cross-sectional size, and the first cross-sectional size is different from the second cross-sectional size. Furthermore, in some embodiments, a third groove is defined in the first compressible member, the first compressible member is configured to receive a third cable of the one or more cables in the third groove, and the plurality of fingers are configured for at least partially restricting movement of the third cable and for forming a seal around the third cable. In some embodiments, a fourth groove is defined in the first compressible member, the first compressible member is configured to receive a fourth cable of the one or more cables in the fourth groove, and the plurality of fingers are configured for at least partially restricting movement of the fourth cable and for forming a seal around the fourth cable.

In some embodiments, the first groove is configured to receive a cable in the first rounded portion when a radius of the cable is less than or equal to a radius of the first rounded portion. Furthermore, in some embodiments, the first groove is configured to receive the cable in the first rounded portion without any deflection in the first straight portion when the radius of the cable is less than or equal to the radius of the first rounded portion. Additionally, in some embodiments, the first straight portion is configured to deflect when the radius of the cable is greater than a radius of the first rounded portion.

In some embodiments, a first finger of the plurality of fingers defines a first width, and the first width is less than or equal to one-third of a minimum cable diameter. Additionally, in some embodiments, the first width is greater than or equal to one-fifth of a maximum cable diameter. Furthermore, in some embodiments, a second finger of the plurality of fingers defines a second width, and the second width is greater than the first width. In some embodiments, the wall portion is formed in the first compressible member between the first groove and the second groove, and the second compressible member is configured to be urged towards the first compressible member so that a free end of the second finger contacts a second surface of the wall portion.

In some embodiments, the first compressible member defines a first end and a second end, a first edge portion is positioned at the first end, a second edge portion is positioned at the second end, and the depth of the first straight portion from the first surface is less than a depth of the first edge portion from the first surface and a depth of the second edge portion from the first surface.

In some embodiments, the first compressible member comprises a foam material that is configured to deform elastically. In some embodiments, the second compressible member comprises a foam material that is configured to deform elastically. Furthermore, in some embodiments, the first compressible member comprises a first foam material that is configured to deform elastically, the second compressible member comprises a second foam material that is configured to deform elastically, and an identical amount of compression results in greater amounts of deformation in the second foam material as compared to the first foam material.

In some embodiments, the plurality of fingers are configured to conform to the shape of a cable. Additionally, in some embodiments, the plurality of fingers comprises a first finger and a second finger, and the first finger and the second finger are capable of deforming in different amounts to conform to the shape of the cable and to conform to the shape of the first compressible member.

In another example embodiment, a system for sealing one or more cables is provided. The system comprises a first compressible member defining a first surface, a second compressible member, and an enclosure. A wall portion and a first groove are defined in the first compressible member opposite the first surface, and the first groove comprises a first rounded portion and a second portion. A minimum depth of the first rounded portion from the first surface is less than a depth of the second portion from the first surface, and the depth of the second portion from the first surface is less than a depth of the wall portion from the first surface. The first compressible member is configured to receive a first cable of the one or more cables in the first groove. The second compressible member comprises a plurality of fingers. A plurality of cuts are formed in the second compressible member, and a respective cut is positioned between adjacent fingers of the plurality of fingers. The plurality of fingers are attached together on one side of the second compressible member. The enclosure comprises a wall, and the wall defines an opening therein. The first cable is configured to be received so that the first cable extends through the opening of the enclosure, and the first compressible member and the second compressible member are positioned at the opening of the enclosure. At least one finger of the plurality of fingers of the second compressible member deforms as the second compressible member is compressed, and the plurality of fingers are configured for at least partially restricting movement of the first cable and for forming a seal around the first cable between the first compressible member and the second compressible member.

In some embodiments, the system also comprises one or more springs. The one or more springs are attached to the second compressible member, and the second compressible member is in contact with the first compressible member when the one or more springs are in their resting position. Additionally, in some embodiments, the first compressible member and the second compressible member are configured to provide strain relief to the one or more cables in the enclosure.

In another example embodiment, a method for forming a seal around one or more cables is provided. The method comprises positioning a first cable of the one or more cables in a first groove of a first compressible member that defines a first surface. The first compressible member defines a wall portion and a first groove, and the first groove comprises a first rounded portion and a first straight portion. A minimum depth of the first rounded portion from the first surface is less than a depth of the first straight portion from the first surface, and the depth of the first straight portion from the first surface is less than a depth of the wall portion from the first surface. The method also comprises orienting a second compressible member such that free ends of a plurality of fingers in the second compressible member face the first compressible member. The second compressible member comprises the plurality of fingers, and the plurality of fingers are attached together on one side of the second compressible member and have free ends on an opposing side of the second compressible member. A plurality of cuts are formed in the second compressible member, and a respective cut is positioned between adjacent fingers of the plurality of fingers. The method also comprises compressing the second compressible member against the first compressible member and the first cable. At least one finger of the plurality of fingers of the second compressible member deforms as the second compressible member is compressed, and the plurality of fingers at least partially restrict movement of the first cable and form a seal around the first cable between the first compressible member and the second compressible member.

In some embodiments, the first compressible member defines a second groove comprising a second rounded portion and a second straight portion. A minimum depth of the second rounded portion from the first surface is less than a depth of the second straight portion from the first surface, and the depth of the second straight portion from the first surface is less than the depth of the wall portion from the first surface. The method further comprises positioning a second cable of the one or more cables in the second groove. At least one finger at least partially restricts movement of the second cable and forms a seal around the second cable. The first cable has a first cross-sectional size and the second cable has a second cross-sectional size, and the first cross-sectional size is different from the second cross-sectional size.

In some embodiments, the first compressible member comprises a first foam material that is configured to deform elastically, the second compressible member comprises a second foam material that is configured to deform elastically, and an identical amount of compression results in greater amounts of deformation in the second foam material as compared to the first foam material.

BRIEF DESCRIPTION OF THE DRAWINGS

Reference will now be made to the accompanying drawings, which are not necessarily drawn to scale, and wherein.

DETAILED DESCRIPTION

Figure 1A:
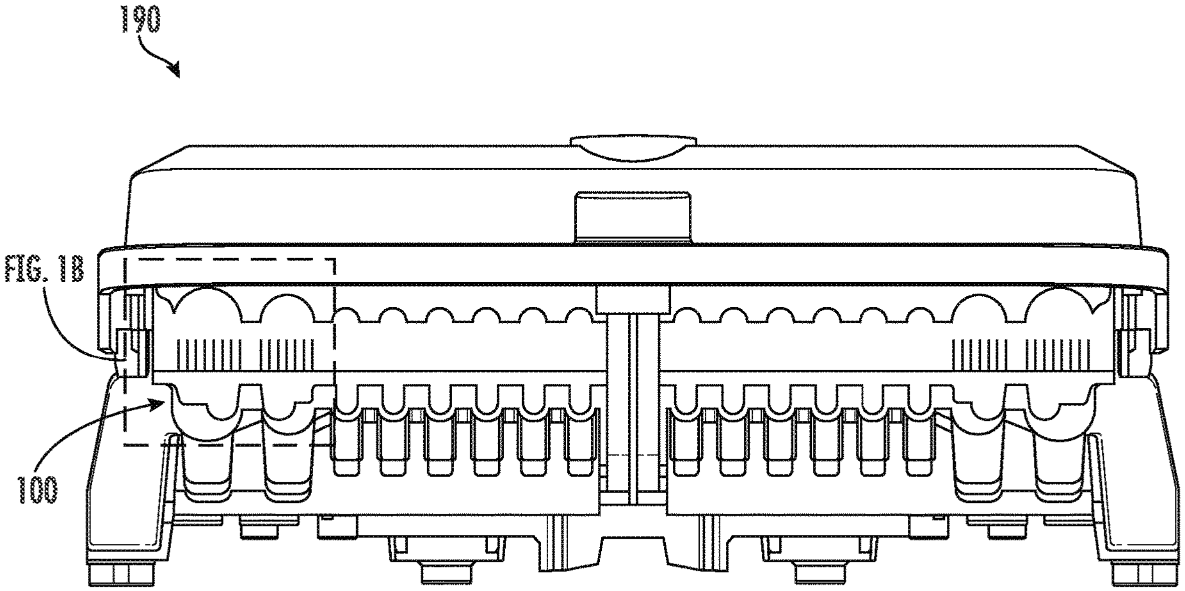
FIG. 1A is a front view of an example enclosure having cable sealing devices of the present disclosure therein to control the positioning of cables within the enclosure, in accordance with some embodiments discussed herein.

Example embodiments now will be described more fully hereinafter with reference to the accompanying drawings, in which some, but not all embodiments are shown. With the exception of reference numerals shown in FIG. 9, like reference numerals generally refer to like elements throughout. For example, reference numerals 100A, 100B, 200, 500, 600, and 700 each refer to a cable sealing device. Additionally, any connections or attachments may be direct or indirect connections or attachments unless specifically noted otherwise.

In general, the present disclosure provides cable sealing devices of an enclosure that can accommodate and control the positioning of inserted cables of various sizes while providing an effective seal for the enclosure.

Referring first to FIG. 1A, an enclosure 190 is provided. As shown and discussed in greater detail herein, the enclosure 190 includes cable sealing devices 100 that are positioned at the left end and the right end of the enclosure 190. However, it is within the scope of the present disclosure that the cable sealing devices 100 may also be positioned in other locations within the enclosure 190 (e.g., at a location(s) between the left end and the right end), and a greater or lesser number of cable sealing devices 100 may be used.

Figure 1B:
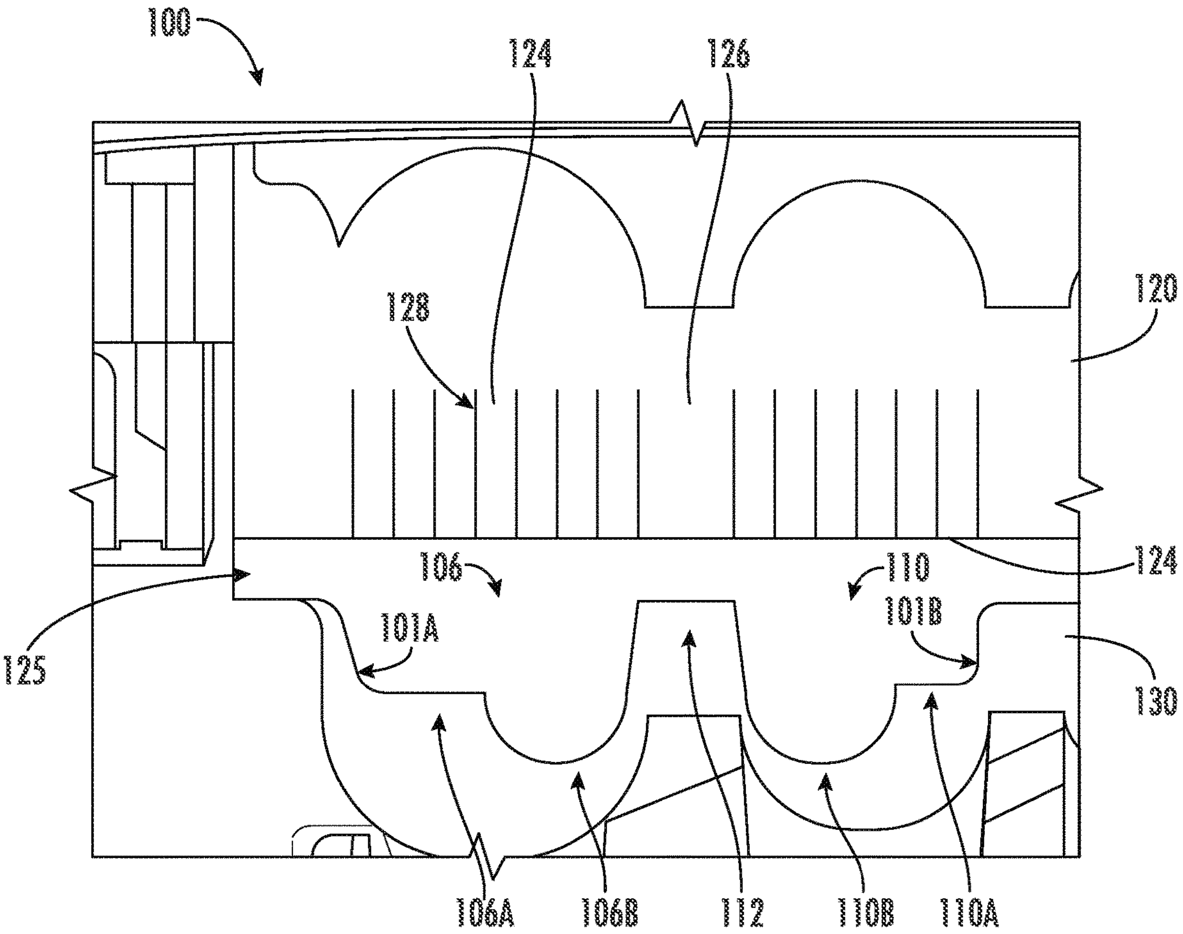
FIG. 1B is an enhanced view of the cable sealing device in the enclosure of FIG. 1A, in accordance with some embodiments discussed herein.

Referring now to FIG. 1B, cable sealing device 100 comprises a first compressible member 130 and a second compressible member 120. The first compressible member 130 comprises grooves 106, 110 on each side of a wall portion 112. A first groove 106 is provided on one side of the wall portion 112, and the first groove 106 includes a first straight portion 106A and a first rounded portion 106B. A second groove 110 is provided on another side of the wall portion 112, and the second groove 110 comprises a second straight portion 110A and the second rounded portion 110B. An opening 125 is provided between the first compressible member 130 and the second compressible member 120, and cables may be positioned within the opening 125 at the first groove 106 or the second groove 110 of the first compressible member 130.

With continued reference to FIG. 1B, the second compressible member 120 includes a plurality of fingers 124 that are defined by cuts 128 within second compressible member 120. As shown, within cable sealing device 100 fingers 124 may be provided proximate to the first groove 106 and the second groove 110 of the first compressible member 130, and an enlarged finger 126 may be provided proximate to the wall portion 112. As discussed in greater detail herein, when a rotatable cover of the enclosure 190 is moved towards a closed position, the second compressible member 120 may advance closer to the first compressible member 130 where the fingers 124, 126 of the second member 120 contact the first compressible member 130 and at least one of the fingers 124, 126 may compress against cables in the grooves 106, 110 and against the first compressible member 130. Consequently, the cables may be secured in a proper position within enclosure 190, and an effective seal may be formed around the cables.

A sidewall 101A is provided at the first groove 106, and a sidewall 101B is provided at the second groove 110. As illustrated, the sidewalls 101A, 101B possess different slopes relative to each other. However, in other embodiments, the sidewalls 101A, 101B may possess the same slopes relative to each other. The sidewall 101A of the first groove 106 is positioned relative to the first straight portion 106A of the first groove 106 so that the sidewall 101A and the first straight portion 106A form an obtuse angle. The sidewall 101B of the second groove 110 is approximately perpendicular to the second straight portion 110A of the second groove 110. However, the sidewalls 101A, 101B may be provided at different slopes in other embodiments.

In some embodiments, the first compressible member 130 and the second compressible member 120 are formed of a compressible foam material. However, it is within the scope of the present disclosure that alternate suitable deformable materials may be used for the first compressible member 130 and the second compressible member 120. The foam material utilized in the first compressible member 130, the second compressible member 120, and any other compressible members described herein may comprise an elastic material that is configured to elastically deform upon an application of a force thereon. As used herein, a material is configured to deform "elastically" when it is capable of restoring to within 95% of the original undeformed shape after the force causing deformation is no longer applied to the material.

Cable sealing devices may beneficially be used to assist in positioning and forming a seal around cables that enter into an enclosure. The cable sealing devices may effectively form IP55 or IP65 enclosures to provide effective seals that protect the inner contents of the enclosure from, for example, water, moisture, dust, etc.

Figure 1C:
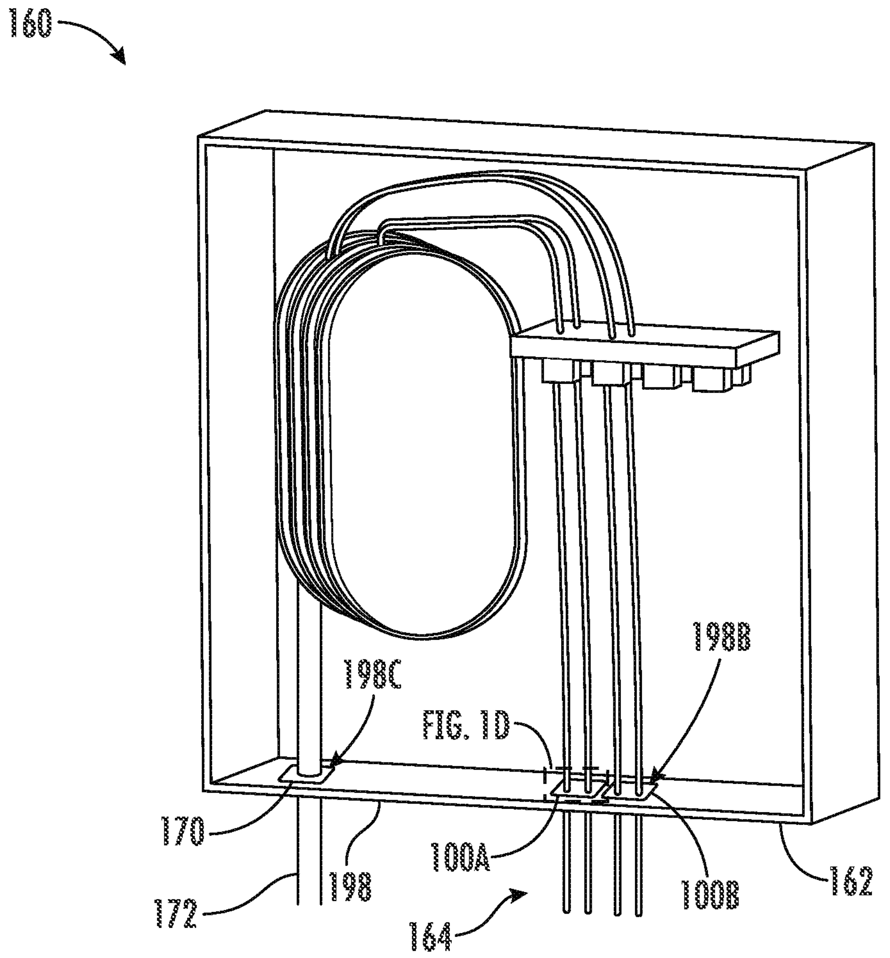
FIG. 1C is a perspective view of another example enclosure having cable sealing devices therein to control the positioning of cables within the enclosure, in accordance with some embodiments discussed herein.

FIG. 1C is a perspective view illustrating a system 160 with an example enclosure 162 (shown without a cover such that the inner contents of enclosure 162 can be seen) having cable scaling devices 100A, 100B, 170 therein to control the positioning of cables 164, 172 within the enclosure 162 and to provide a seal for the enclosure 162. The enclosure 162 possesses various walls as shown. The first cable sealing device 100A is installed in a first opening 198A (see FIG. 1D) in the bottom wall 198 of the enclosure 162, the second cable scaling device 100B is installed in a second opening 198B in the bottom wall 198 of the enclosure 162, and the third cable sealing device 170 is installed in the third opening 198C in the bottom wall 198 of the enclosure 162. A first cable sealing device 100A and a second cable sealing device 100B are each configured to receive two cables of cables 164, and the third cable scaling device 170 is configured to receive one cable 172. In the illustrated embodiment, the cable 172 has a larger diameter than that of cables 164. The cable sealing devices 100A, 100B, 170 may permit cables to extend through openings 198A, 198B, 198C at the bottom wall 198 of the enclosure 162 in a controlled manner.

In some embodiments, the first and second compressible members 130, 150 (see FIG. 1D) that form the cable sealing devices 100A, 100B, 170 may be configured to provide strain relief to the one or more cables in the enclosure 162. While the cable sealing devices 100A, 100B, 170 are shown as all part of a bottom wall 198, like the enclosure 190 in FIG. 1A, one or more of the cable sealing devices 100A, 100B, 170 may have the corresponding first compressible member 130 and second compressible member 150 split between a cover (not shown) and the bottom wall 198, such that closing the cover may cause the first and second compressible members 130, 150 of the cable sealing devices 100A, 100B, 170 to come together to seal one or more cables positioned therein.

Figure 2A:
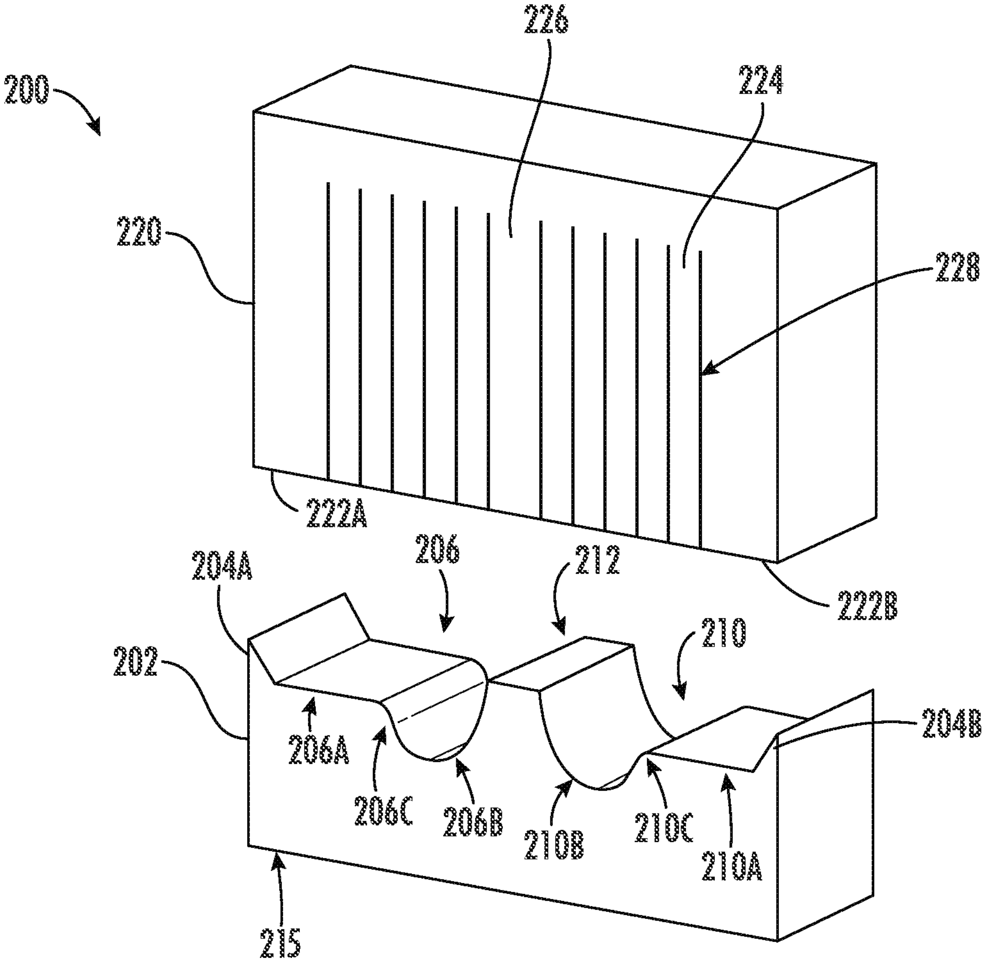
FIG. 2A is a perspective view of a cable sealing device of the present disclosure, in accordance with some embodiments discussed herein.
Figure 2B:
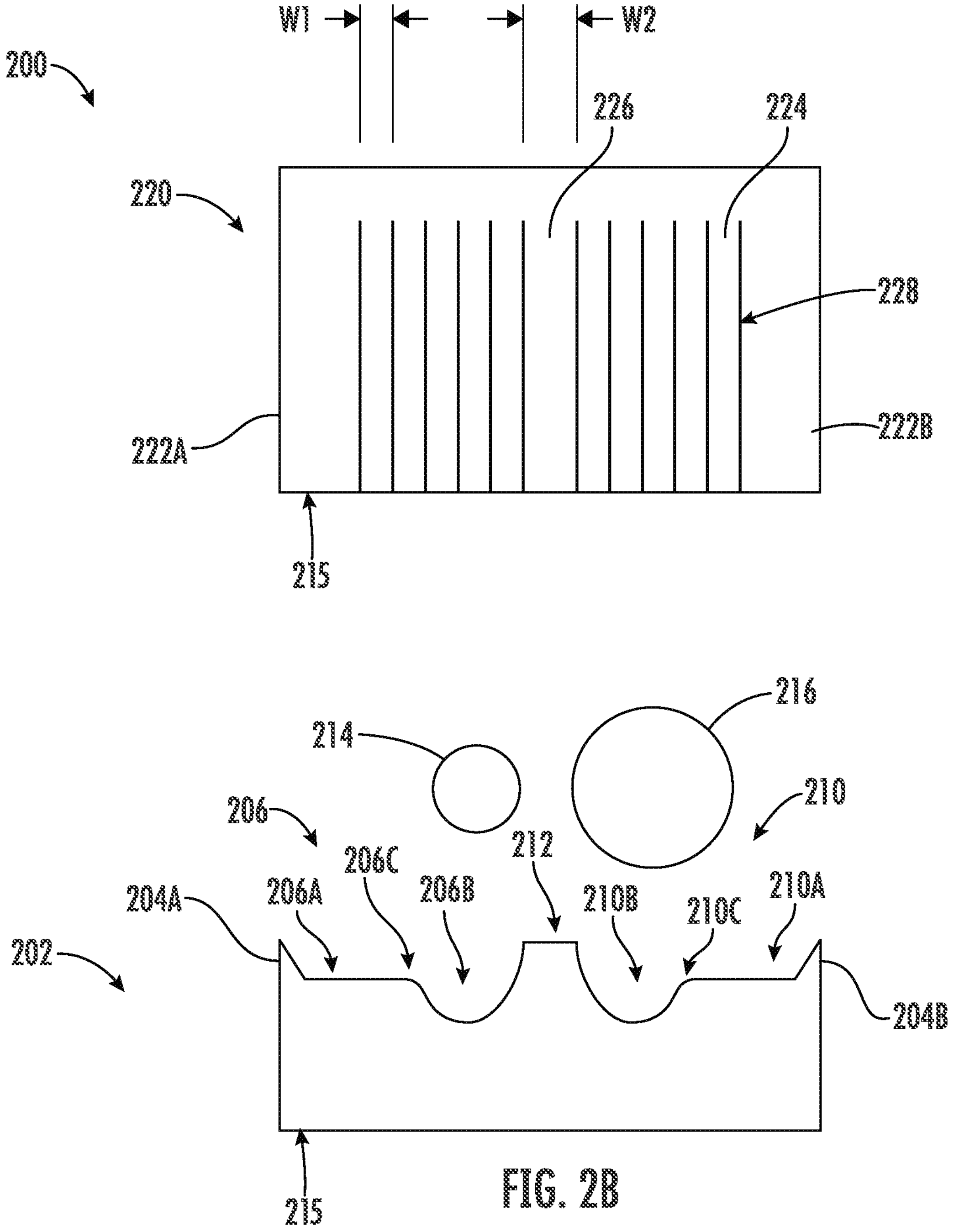
FIG. 2B is a front, exploded view of the cable sealing device of FIG. 2A as applied onto two cables, in accordance with some embodiments discussed herein.

Referring now to FIGS. 2A-2B, perspective views of cable sealing device 200 are provided. As shown, the cable sealing device 200 comprises a first compressible member 202 and a second compressible member 220. The first compressible member 202 and the second compressible member 220 have similar configurations as the first compressible member 130 and the second compressible member 150, respectively, of FIGS. 1C-ID each of which are discussed in greater detail herein.

Referring now to FIG. 2B, further details regarding the first compressible member 202 are shown. FIG. 2B is a front, exploded view illustrating the example cable sealing device 200 of FIG. 2A as applied onto two cables 214, 216 where the cable sealing device 200 forms an effective seal for the first cable 214 and the second cable 216 as discussed in greater detail herein.

First compressible member 202 defines a first surface 215. This first surface 215 is the bottom surface of the first compressible member 202 in the illustrated embodiment of FIG. 2A. However, the first compressible member 202 may be oriented differently, and the first surface 215 may not be the bottom surface when the first compressible member 202 is oriented differently. The first compressible member 202 also includes a wall portion 212 and two grooves 206, 210 defined therein, with the wall portion 212 and the grooves 206, 210 defined in the first compressible member 202 opposite the surface 215. A first groove 206 comprises a first straight portion 206A, a first transition portion 206C, and a first rounded portion 206B. A second groove 210 comprises a second straight portion 210A, a second transition portion 210C, and a second rounded portion 210B. The wall portion 212 separates the first groove 206 and the second groove 210, and the wall portion 212 may provide tightness between cables in the grooves 206, 210. When a cable 214, 216 is smaller than the rounded portion 206B, 210B or equal in size to the rounded portion 206B, 210B (e.g., when a radius of the cable 214, 216 is less than or equal to a minimum radius of a rounded portion 206B, 210B), the groove 206, 210 may be configured to receive a cable 214, 216 in the rounded portion 206B, 210B without any deflection in the associated straight portion 206A, 210A. For example, the radius of the first cable 214 is less than a minimum radius of curvature at the first rounded portion 206B, and the first groove 206 is configured to receive the first cable 214 in the first rounded portion 206B without any deflection in the first straight portion 206A and/or the first transition portion 206C. By contrast, when a cable 214, 216 is larger than a rounded portion 206B, 210B (e.g., where the radius of a cable is greater than a minimum radius of a rounded portion), the associated straight portion and/or transition portion may be configured to deflect. For example, a radius of the second cable 216 is greater than a minimum radius of curvature at the second rounded portion 210B, and the second rounded portion 210B is therefore too small to hold the second cable 216 on its own without any deflection in the first compressible member 202. Thus, as the second cable 216 is urged towards the first compressible member 202 by the second compressible member 220, the downward force generated by the second cable 216 on the first compressible member 202 causes deflection in the first compressible member 202 at the second transition portion 210C and the second straight portion 210A, and the deflection at the second transition portion 210C and the second straight portion 210A may result in an increased contact area between the second cable 216 and the first compressible member 202. The increased contact area may help form a more effective seal.

Additionally, edge portions 204A, 204B may be provided in the first compressible member 202 at each end of the first compressible member 202. For example, in FIG. 2B, the first compressible member 202 defines a first end (towards the left in FIG. 2B) and a second end (towards the right in FIG. 2B). A first edge portion 204A is positioned at the first end, and a second edge portion 204B is positioned at the second end. The enlarged size of the edge portions 204A, 204B relative to adjacent straight portions 206A, 210A may ensure tightness and an effective seal at the edges of the cable sealing device 200.

Cables may be received in the grooves 206, 210 of the first compressible member 202, and the geometry of the first compressible member 202 may assist in positioning the cables and forming an effective seal around the cables. In the embodiment illustrated in FIG. 2B, the second cable 216 has a larger cross-sectional size than the first cable 214, and the geometry and material used in the first compressible member 202 may enable the first compressible member 202 to form an effective seal for both the first cable 214 and the second cable 216 (no matter on which side of the wall portion 212 each cable is positioned). In some embodiments, the first cable 214 and the second cable 216 may both possess circular cross sections, and the cross-sectional sizes of the first cable 214 and the second cable 216 may be defined based on the radius of the first cable 214 and the second cable 216. In some embodiments, some or all of the rounded portions 206B, 210B may have a radial curvature. However, the rounded portions 206B, 210B may possess other curvatures (e.g., parabolic, sinusoidal, etc.).

A second compressible member 220 is also illustrated in FIG. 2B. Referring briefly to FIG. 2B, details regarding the example second compressible member 220 of the cable sealing device 200 are shown. The second compressible member 220 comprises a plurality of fingers 224, an enlarged finger 226, first end finger 222A, and second end finger 222B. As shown and discussed in greater detail herein, there can be variability in widths among the plurality of fingers 224. For example, the second compressible member 220 comprises fingers 224, with each of the fingers 224 defining a first width (W1) in a direction extending from the first end finger 222A to the second end finger 222B. In some embodiments, the first width (W1) may be less than or equal to one-third of a minimum cable diameter that the cable sealing device 200 is recommended for use with. This may enable at least three different fingers 224 to be compressed against a cable, and this may be beneficial to enable fingers 224 to deform in differing amounts so that the fingers 224 may better conform to the shape of the cable. Additionally, the first width (W1) may be greater than or equal to one-fifth of a maximum cable diameter that the cable sealing device 200 is recommended for use with. However, in other embodiments, the first width (W1) may possess larger or smaller values to enable a lesser or greater number of fingers 224 to contact cables. The fingers 224 illustrated in FIG. 2B are capable of deforming in different amounts to conform to the shape of cables 214, 216 and to conform to the shape of the first compressible member 202. At least one finger 224, 226 of the second compressible member 220 may deform as the second compressible member 220 is compressed, allowing the fingers 224, 226 to restrict movement of the first cable 214 at least partially and form a seal around a cable.

In the illustrated embodiment, the second compressible member 220 further comprises an enlarged finger 226. This enlarged finger 226 is located in the center of the second compressible member 220 in FIG. 2B, and the enlarged finger 226 defines a second width (W2) in a direction extending from the first end finger 222A to the second end finger 222B. The second width (W2) is greater than the first width (W1). In some embodiments, the second width (W2) may match the width of a surface of the wall portion 212 that is formed in the first compressible member 202 between the first groove 206 and the second groove 210, and the second compressible member 220 may be urged towards the first compressible member 202 so that a free end of the enlarged finger 226 contacts a surface of the wall portion 212. In some embodiments, the second width (W2) may be determined based on desired distance between two cables. The enlarged finger 226 is capable of deforming in different amounts relative to the other fingers 222A, 222B, 224 to allow the second compressible member 220 to conform to the shape of cables 214, 216 and to conform to the shape of the first compressible member 202.

Additionally, as mentioned previously, second compressible member 220 also includes a first end finger 222A provided on one end of the second compressible member 220 and a second end finger 222B provided on a second end of the second compressible member 220. In the illustrated embodiment, the first end finger 222A and the second end finger 222B have a width that is greater than each of the first width (W1) and the second width (W2) of fingers 224, 226, respectively. However, it is within the scope of the present disclosure that other widths may be utilized for end fingers 222A, 222B. Each of the fingers 222A, 222B, 224, 226 are attached (e.g., integrally formed, attached with adhesive or otherwise, etc.) with second compressible member 220 on one side of the second compressible member 220 with free-ends that extend to another side of second compressible member 220 (e.g., the bottom side in FIG. 2B).

In FIG. 2B, the end faces of the free-ends of fingers 222A, 222B, 224, 226 rest in the same plane. However, in some embodiments, the end faces of the free-ends of the fingers 222A, 222B, 224, 226 may not rest in the same plane. For example, the enlarged finger 226 may be shorter than the other fingers so that the end face of the free-end of the enlarged finger 226 may be offset from the end faces of the other fingers. This may be beneficial to appropriately position the wall portion 212 relative to the enlarged finger 226, which in turn, positions the first compressible member 202 relative to the second compressible member 220 appropriately.

A plurality of cuts 228 are formed in the second compressible member 220 to define fingers 222A, 222B, 224, 226. A respective cut 228 is, for example, positioned between adjacent fingers 224, 226 of the plurality of fingers 224, 226. Cuts 228 may enable the second compressible member 220 to have a more precise fit than other devices without these cuts, and cuts 228 may enable the second compressible member 220 to have a more precise fit where two or more cables of different sizes are used.

In some embodiments, a compression member in the form of the second member 220 may be used independently and without the first member 202, and the compression member 220 may be urged towards one or more objects (e.g., one or more cables) so that the fingers 222A, 222B, 224, 226 of the compression member 220 deform as the compression member is urged towards the object(s). The fingers 222A, 222B, 224, 226 may at least partially restrict movement of the object(s) and at least partially forms a seal around the more object(s). However, the compression member 220 may possess other geometries such as the geometry of the second compressible member 850 illustrated in FIG. 8A, the geometry of the second compressible member 882 illustrated in FIG. 8B, or another geometry.

The first compressible member 202 and/or the second compressible member 220 may comprise a foam material that is configured to deform elastically. In some embodiments, the first compressible member 202 and the second compressible member 220 may comprise two different foam materials, and the foam material of the second compressible member 220 may be configured to undergo a greater amount of deformation than the foam material of the first compressible member 202 when the materials undergo an identical amount of compression. Furthermore, the density of the foam material of the first compressible member 202 and the foam material of the second compressible member 220 may be different.

Figure 3:
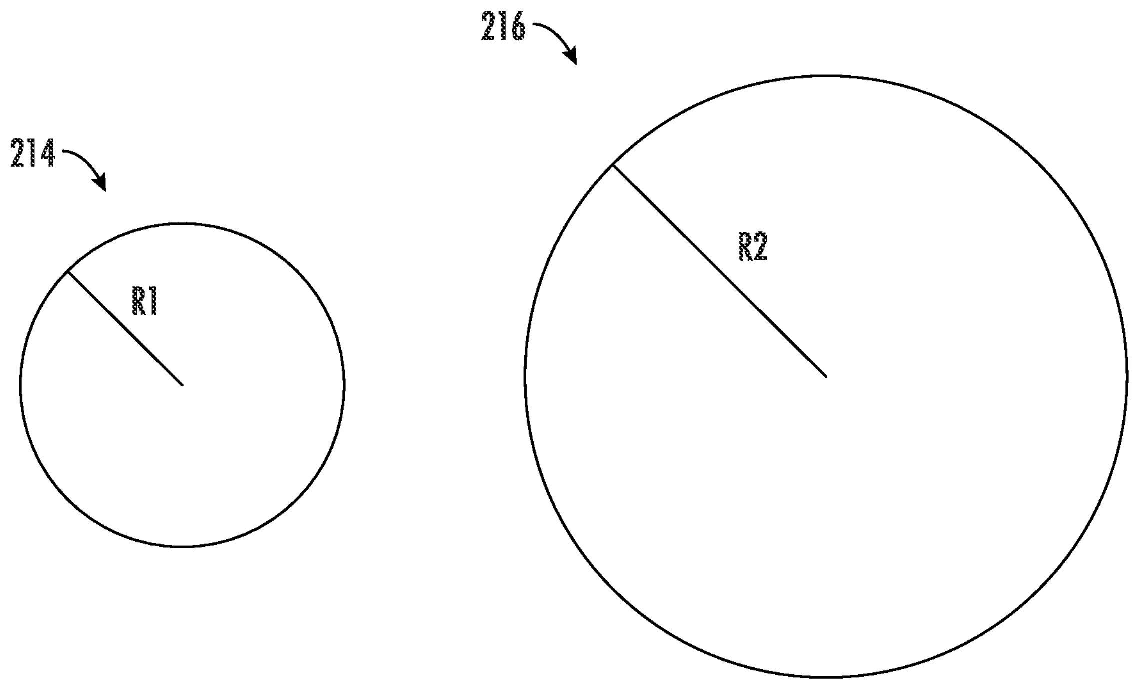
FIG. 3 is a cross-sectional view of the two cables of FIG. 2B that may be received in the cable sealing device of FIG. 2A, in accordance with some embodiments discussed herein.

Example cross-sections of cables that may be received in the example cable sealing device 200 are shown in FIG. 3. A first cable 214 having a first radius R1 is provided in FIG. 3, and a second cable 216 having a second radius R2 is also provided. As illustrated in FIG. 3, the first radius R1 and the second radius R2 are different.

In some embodiments, the cable sealing device 200 may be configured to operate with cables having a radius falling between a minimum cable radius and a maximum cable radius. The first radius R1 is the minimum cable radius that the cable sealing device 200 is recommended for use with, and the second radius R2 is the maximum cable radius that the cable sealing device 200 is recommended for use with. The sizes and geometry of the cable scaling devices 200 may be adjusted to operate with a wide variety of cables. In various example embodiments, the maximum cable radius that the cable scaling device 200 is recommended for use with is 15 millimeters, and the minimum cable radius that the cable scaling device 200 is recommended for use with is 7.5 millimeters. While the first groove 206 and the second groove 210 are identical in size in the illustrated embodiment, the two grooves 206, 210 may have different sizes in other embodiments, and this may be beneficial where the cable sealing device is expected to regularly be used with cables having different cross-sectional sizes.

Additionally, in embodiments where a cable sealing device 200 is used with two or more cables, the cable sealing device 200 may be most effective where the difference in the radius between the two different cables is less than a maximum difference value (e.g., the difference in the maximum cable radius and the minimum cable radius). The size and geometry of the cable sealing devices 200 may be adjusted to operate with a wide variety of cables. In the example embodiment, the maximum difference value that the cable sealing device 200 is recommended for use with is 7.5 millimeters. However, this value may be greater or smaller where the cable sealing device 200 is provided in another size.

Figure 1D:
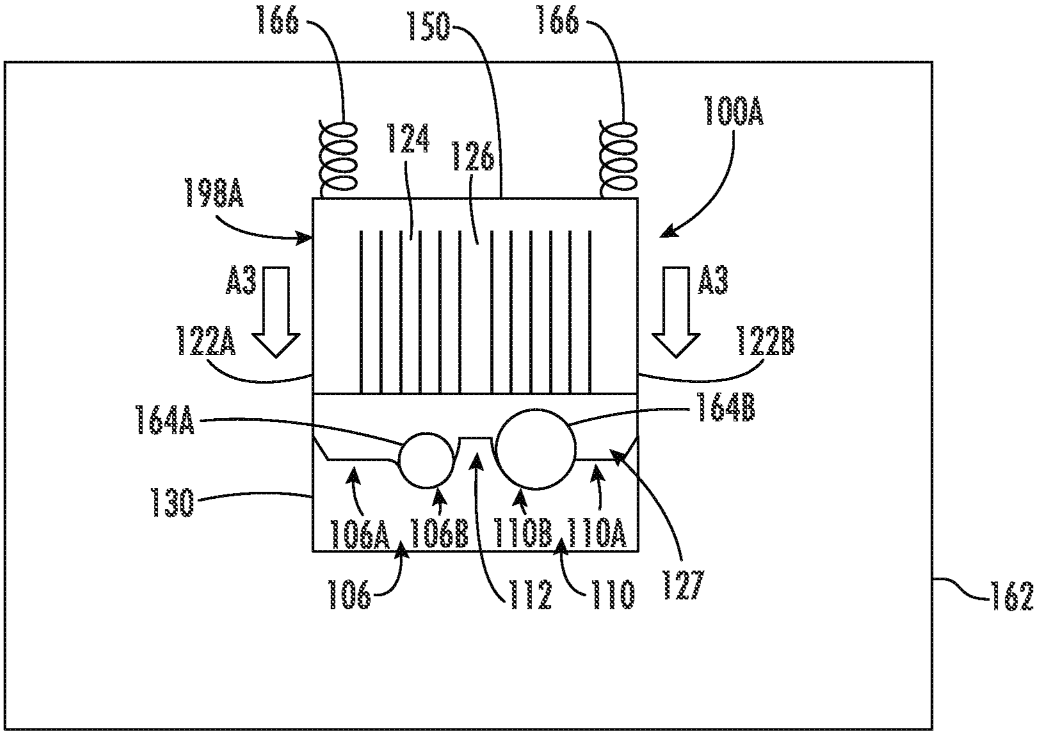
FIG. 1D is an enhanced view of the cable sealing device in the enclosure of FIG. 1C, in accordance with some embodiments discussed herein.

Turning now to FIG. 1D, further details regarding the configuration and operation of a first cable sealing device 100A are shown. As illustrated, the first cable sealing device 100A comprises a first compressible member 130 and a second compressible member 150. The first cable sealing device 100A and the first compressible member 130 and the second compressible member 150 therein may operate similar to the cable sealing device 200, the first compressible member 202, and the second compressible member 220 illustrated in FIGS. 2A and 2B and described further herein. The first compressible member 130 comprises a first groove 106 and a second groove 110 on each side of a wall portion 112. A first groove 106 is provided on one side of the wall portion 112, and the first groove 106 includes a first straight portion 106A and a first rounded portion 106B. A second groove 110 is provided on another side of the wall portion 112, and the second groove 110 comprises a second straight portion 110A and the second rounded portion 110B. An opening 127 is provided between the first compressible member 130 and the second compressible member 150, and cables 164A, 164B may be positioned within the opening 127 at the first groove 106 or the second groove 110 of the first compressible member 130.

The second compressible member 150 includes a plurality of fingers 124 similar to FIGS. 1A-1B. As shown, the plurality of fingers 124 are defined by cuts within second compressible member 150. As shown, within cable sealing device 100, fingers 124 may be provided proximate to the first groove 106 and the second groove 110 of the first compressible member 130, and an enlarged finger 126 may be provided proximate to the wall portion 112. The second compressible member 150 also comprises a first end finger 122A and a second end finger 122B.

Within cable sealing device 100A, a first cable 164A and a second cable 164B are provided in opening 127 between the first compressible member 130 and the second compressible member 150. The first cable 164A and the second cable 164B may be received in grooves 106, 110 formed within the first compressible member 130. In some embodiments and as shown in FIG. 1D, springs 166 may be provided and coupled to second compressible member 150 to urge the second compressible member 150 along the direction A3 indicated towards the first compressible member 130 and the cables 164A, 164B so that the second compressible member 150 contacts the cables 164A, 164B and the first compressible member 130. In particular, at least some of the plurality of fingers 124 of the second compressible member 150 contact the first compressible member 130 and the second compressible member 150 such that movement of cables 164A, 164B is at least partially restricted and such that a seal is formed around the cables 164A, 164B.

As mentioned previously, springs 166 may be attached to the second compressible member 150 of the first cable sealing device 100A to urge the second compressible member 150 towards the first compressible member 130. In some embodiments, springs 166 may be configured such that, when the springs 166 are in their natural resting position without any forces being applied by a user, the springs 166 cause the second compressible member 150 to be in contact with the first compressible member 130. The seal formed by the cable sealing device 100A protect the inner contents of the enclosure 162 from the surrounding environment. For example, the seal may protect inner contents of the enclosure 162 from rain, moisture in the air, debris, etc. Additionally, the seal may provide improved insulation for the enclosure 162.

Figure 4:
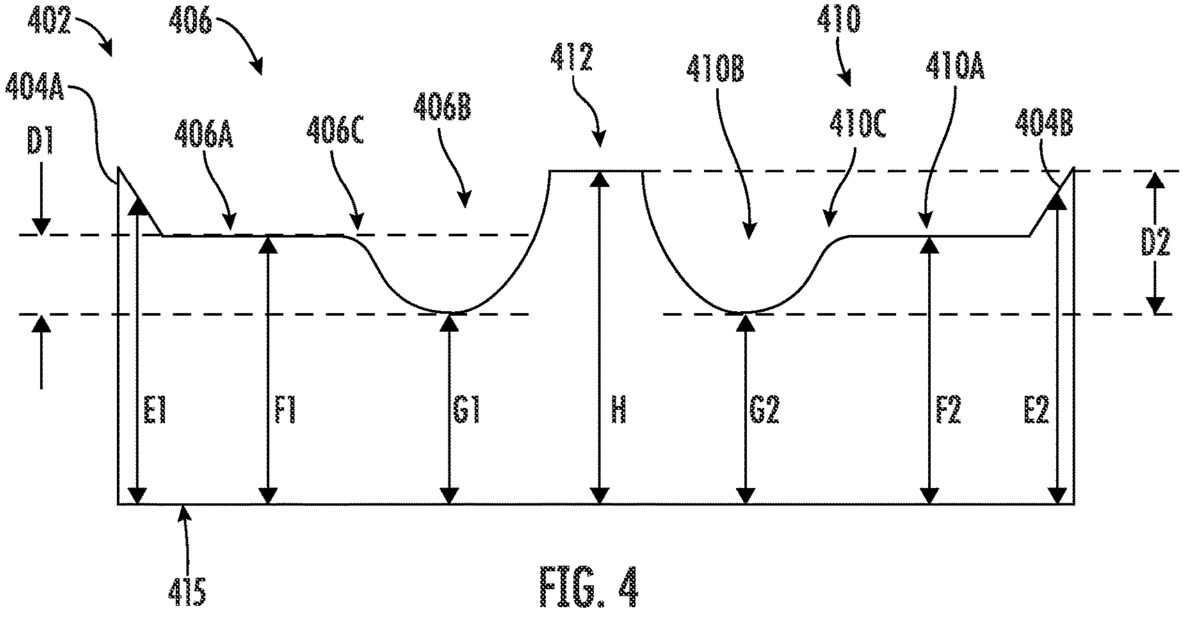
FIG. 4 is a front view of a first compressible member of the cable sealing device of FIG. 2A, in accordance with some embodiments discussed herein.

Other features of the example first compressible member of the cable sealing device 200 are illustrated in the front views of FIG. 4. The first compressible member 402 defines a surface 415. This surface 415 is the bottom surface of the first compressible member 402 in the illustrated embodiment of FIG. 4. However, the first compressible member 402 may be oriented differently, and the surface 415 may not be the bottom surface when the first compressible member 402 is oriented differently. As illustrated in FIG. 4, the first compressible member 402 has a wall portion 412, and the first compressible member 402 also has two grooves 406, 410 defined therein. The wall portion 412 and the grooves 406, 410 are defined in the first compressible member 402 opposite the surface 415. A first groove 406 comprises a first straight portion 406A, a first rounded portion 406B, and a first transition portion 406C. A second groove 410 comprises a second straight portion 410A, a second rounded portion 410B, and a second transition portion 410C. The wall portion 412 separates the first groove 406 and the second groove 410, and the wall portion 412 may provide tightness between cables in the grooves 406, 410. The transition portions 406C, 410C may comprise convex fillets in some embodiments.

Additionally, edge portions 404A, 404B may be provided in the first compressible member 402 at each end of the first compressible member 402. For example, in FIG. 4, the first compressible member 402 defines a first end (towards the left in FIG. 4) and a second end (towards the right in FIG. 4). A first edge portion 404A is positioned at the first end, and a second edge portion 404B is positioned at the second end. The enlarged heights (also referred to herein as "depth") of the edge portions 404A, 404B relative to adjacent straight portions 406A, 410A may ensure tightness and an effective seal at the edges of the cable sealing device 200 (see FIG. 2B).

As shown in FIG. 4, different portions of the first compressible member 402 may possess different depths from the surface 415. Based on the vertical orientation of the first compressible member 402, these depth measurements extend up and down. However, the first compressible member 402 may be rotated to other orientations in other embodiments. The first edge portion 404A may possess a depth E1 from the surface 415, and the second edge portion 404B may possess a depth E2 from the surface 415. Depth E1 and depth E2 may both be an average depth of the edge portions 404A, 404B in some embodiments. In the embodiment illustrated in FIG. 4, the geometry of the second edge portion 404B mirrors the geometry of the first edge portion 404A so that the depth E1 and the depth E2 are the same.

The first straight portion 406A may possess a depth F1 from the surface 415, and the second straight portion 410A may possess a depth F2 from the surface 415. In the illustrated embodiment, the first straight portion 406A possesses a uniform depth F1 throughout the entire first straight portion 406A, and the second straight portion 410A possesses a uniform depth F2 throughout the entire second straight portion 410A. However, in other embodiments, the first straight portion 406A may be sloped at an angle (or otherwise configured) so that the depth is not uniform throughout the entire first straight portion 406A, and the second straight portion 410A may be sloped at an angle (or otherwise configured) so that the depth is not uniform throughout the entire second straight portion 410A. The geometry of the second straight portion 410A may mirror the geometry of the first straight portion 406A.

A first transition portion 406C may be provided between the first straight portion 406A and the first rounded portion 406B in some embodiments, and a second transition portion 410C may be provided between the second straight portion 410A and the second rounded portion 410B in some embodiments. In the illustrated embodiment of FIG. 4, the first transition portion 406C and the second transition portion 410C are each rounded similar to a convex fillet in order to enable smooth transitions between the respective rounded portion and the respective straight portion. However, the geometry for the transition portions 406C, 410C may be different in other embodiments. The geometry of the first transition portion 406C may mirror the geometry of the second transition portion 410C.

In FIG. 4, a first rounded portion 406B is provided between the first straight portion 406A and the wall portion 412, and a second rounded portion 410B is provided between the second straight portion 410A and the wall portion 412. The first rounded portion 406B may define a minimum depth G1 from the surface 415, and the second rounded portion 410B may define a minimum depth G2 from the surface 415. In some embodiments, the first rounded portion 406B and the second rounded portion 410B may define non-radial curvatures (e.g., parabolic, sinusoidal, etc.). In other embodiments, some part of the first rounded portion 406B may define a radius of curvature, and some part of the second rounded portion 410B may define a radius of curvature.

The wall portion 412 is provided between the first rounded portion 406B of the first groove 406 and the second rounded portion 410B of the second groove 410. The wall portion 412 defines a depth H from the surface 415. As illustrated in FIG. 4, the depth H of the wall portion 412 is generally larger than the depth of the other portions of the first compressible member 402. However, the tip of the first edge portion 404A on the far left and the tip of the second edge portion 404B on the far right match the depth H. The depth E1 of the first edge portion 404A and the depth E2 of the second edge portion 404B are generally smaller than the depth H of the wall portion 412, and the depths E1, E2 are generally larger than the depth F1 of the first straight portion 406A, the depth F2 of the second straight portion 410A, the minimum depth G1 of the first rounded portion 406B, and the minimum depth G2 of the second rounded portion 410B. The depth F1 of the first straight portion 406A and the depth F2 of the second straight portion 410A are larger than the minimum depth G1 of the first rounded portion 406B and the minimum depth G2 of the second rounded portion 410B, but the depths F1, F2 of the straight portions are smaller than other portions of the first compressible member 402. The minimum depth G1 of the first rounded portion 406B and the minimum depth G2 of the second rounded portion 410B are smaller than the other portions of the first compressible member 402.

The geometry of the first rounded portion 406B and the geometry of the second rounded portion 410B mirror each other in FIG. 4. The distance D1 is defined as the distance between the straight portions 406A, 410A and the point at the surface of the rounded portions 406B, 410B having a minimum depth. The distance D2 is defined as the distance between a top surface of the wall portion 412 and the point at the surface of the rounded portions 406B, 410B having a minimum depth. The distance D1 may match the minimum cable radius that the cable sealing device is recommended for use with, and the distance D2 may match the maximum cable radius that the cable sealing device is recommended for use with.

As mentioned previously in reference to FIG. 1B, to seal an enclosure 190, the second compressible member 120 may be shifted towards the first compressible member 130 to generate compression between the two compressible members 120, 130, and the second compressible member 120 may deform to conform to the shape of the first compressible member 130 and the cable(s) 214, 216 (see FIG. 2B) being sealed therein. FIGS. 5A-5D are perspective views illustrating an example cable sealing device 500 similar to the one illustrated in FIG. 2A where the second compressible member 520 is shifted towards the first compressible member 502 so that fingers 224, 226 (see FIG. 2B) in the second compressible member 520 are compressed.

Figure 5A:
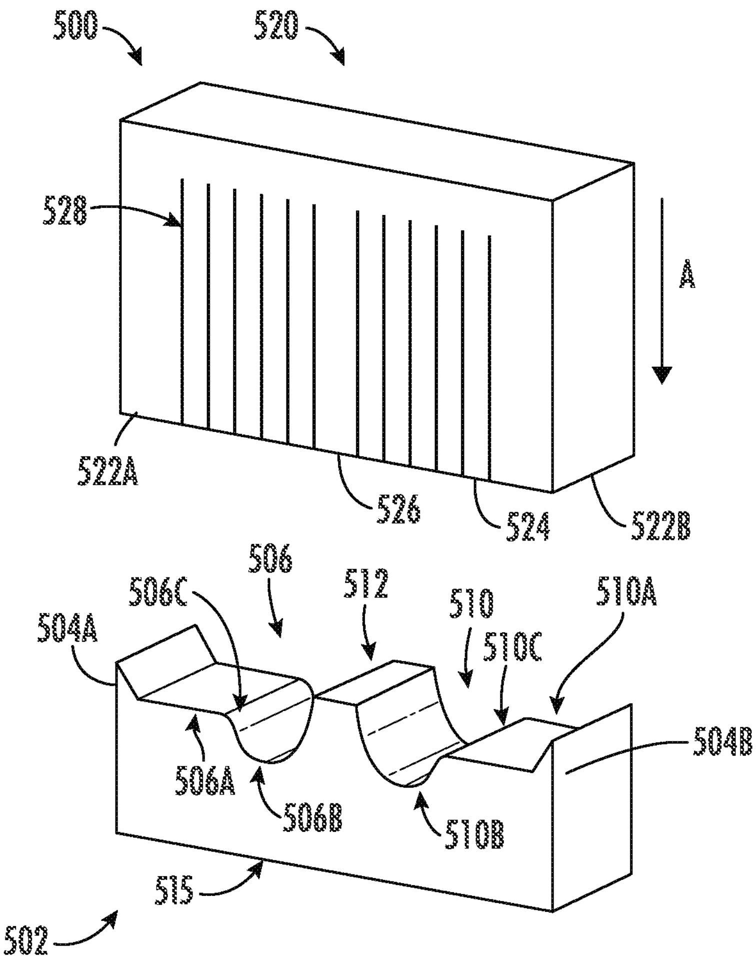
FIGS. 5A-5D are perspective views of the example cable sealing device of FIG. 2A where the second compressible member is shifted towards the first compressible member such that the second compressible member contacts the first compressible member and at least one of the fingers deform (e.g., compresses) based on the shape of the first compressible member, in accordance with some embodiments discussed herein.
Figure 5B:
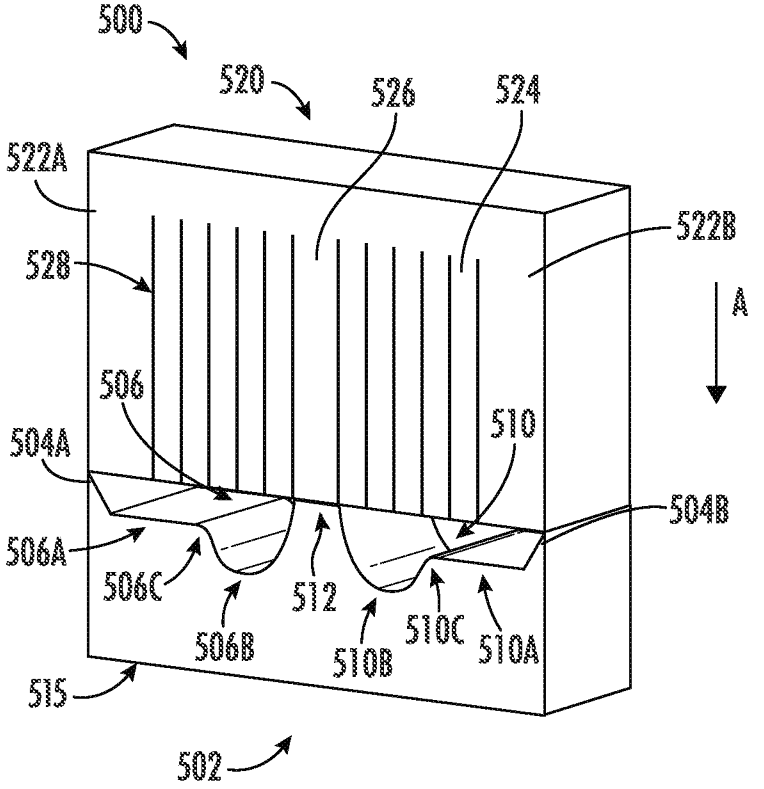

In FIG. 5A, the first compressible member 502 is offset away from the second compressible member 520. The first compressible member 502 defines a surface 515, with the wall portion 512 and the grooves 506, 510 defined in the first compressible member 502 opposite the surface 515. The second compressible member 520 has a plurality of cuts 528 formed in the second compressible member 520 to define a first end finger 522A, a second end finger 522B, fingers 524, and an enlarged finger 526. In FIG. 5B, the second compressible member 520 is moved along direction A such that second compressible member 520 is in light contact with the first compressible member 502, but the first compressible member 502 and the second compressible member 520 have not been compressed in FIG. 5B. In FIG. 5B, a free end of the enlarged finger 526 is in contact with a top surface of the wall portion 512, the first end finger 522A is in contact with the first edge portion 504A, and the second end finger 522B is in contact with the second edge portion 504B. However, other portions of the second compressible member 520 such as the fingers 524 are not in contact with the first compressible member 502 in FIG. 5B. As the second compressible member 520 is urged further towards the first compressible member 502 beyond the relative positions illustrated in FIG. 5B, the second compressible member 520 and the first compressible member 502 may begin being compressed together to cause deformation in the second compressible member 520 and/or the first compressible member 502.

Figure 5C:
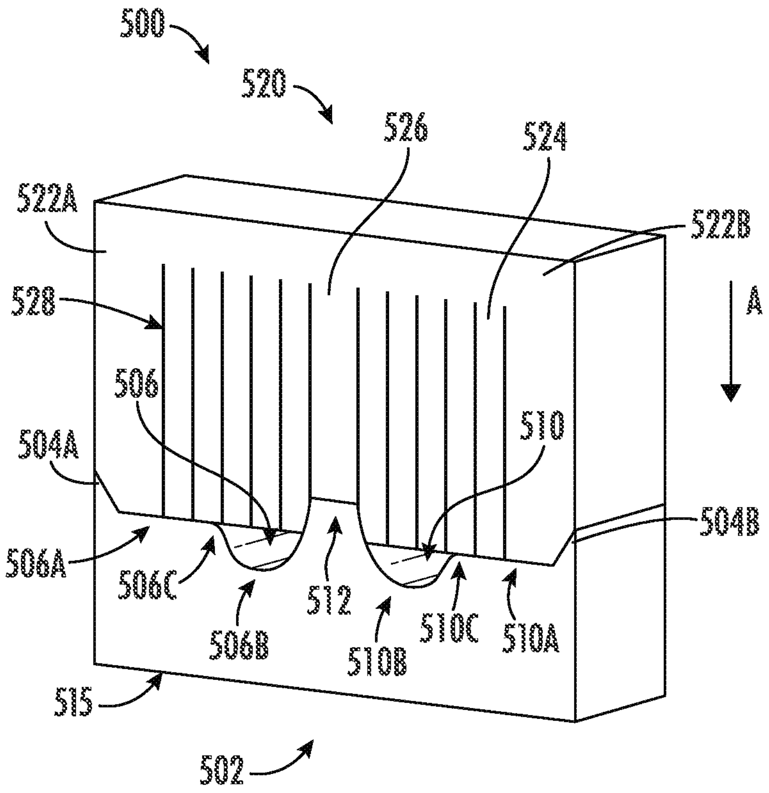

In FIG. 5C, the second compressible member 520 is urged further along direction A towards the first compressible member 502 so that the fingers 524 are in contact with the first straight portion 506A and the second straight portion 510A.

Figure 5D:
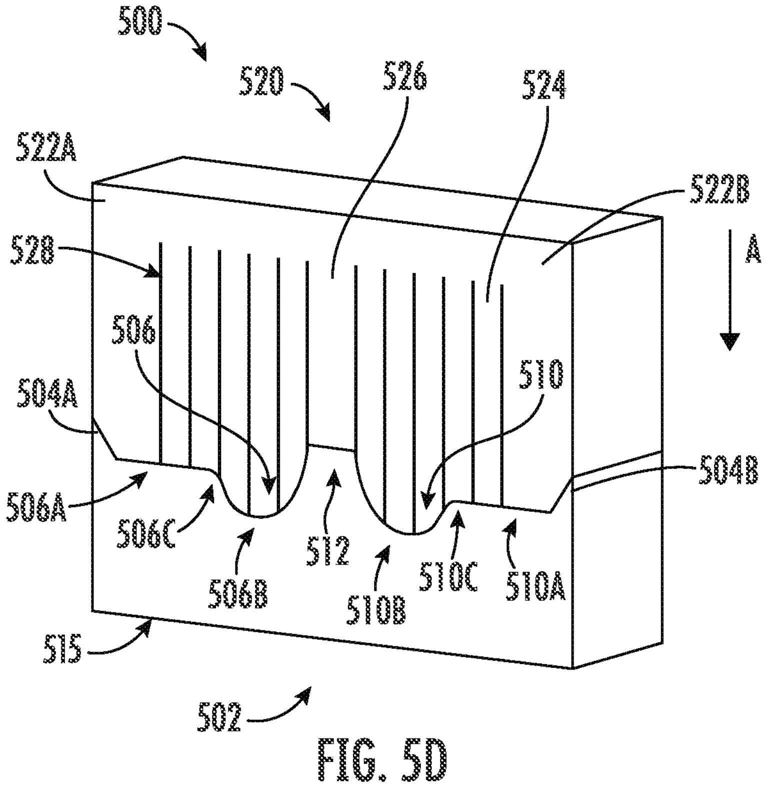

Furthermore, in FIG. 5D, the second compressible member 520 is urged further along direction A towards the first compressible member 502 so that fingers 524 are in contact with all portions of the first rounded portion 506B of the first groove 506, the first transition portion 506C of the first groove 506, the second rounded portion 510B of the second groove 510, and the second transition portion 510C of the second groove 510. As the second compressible member 520 is urged further towards the first compressible member 502, the fingers 524 and other portions of the second compressible member 520 may deform in variable amounts so that the fingers 524 conform to the shape of the first compressible member 502 and any cables provided in the grooves 506, 510 of the first compressible member 502.

Figure 6A:
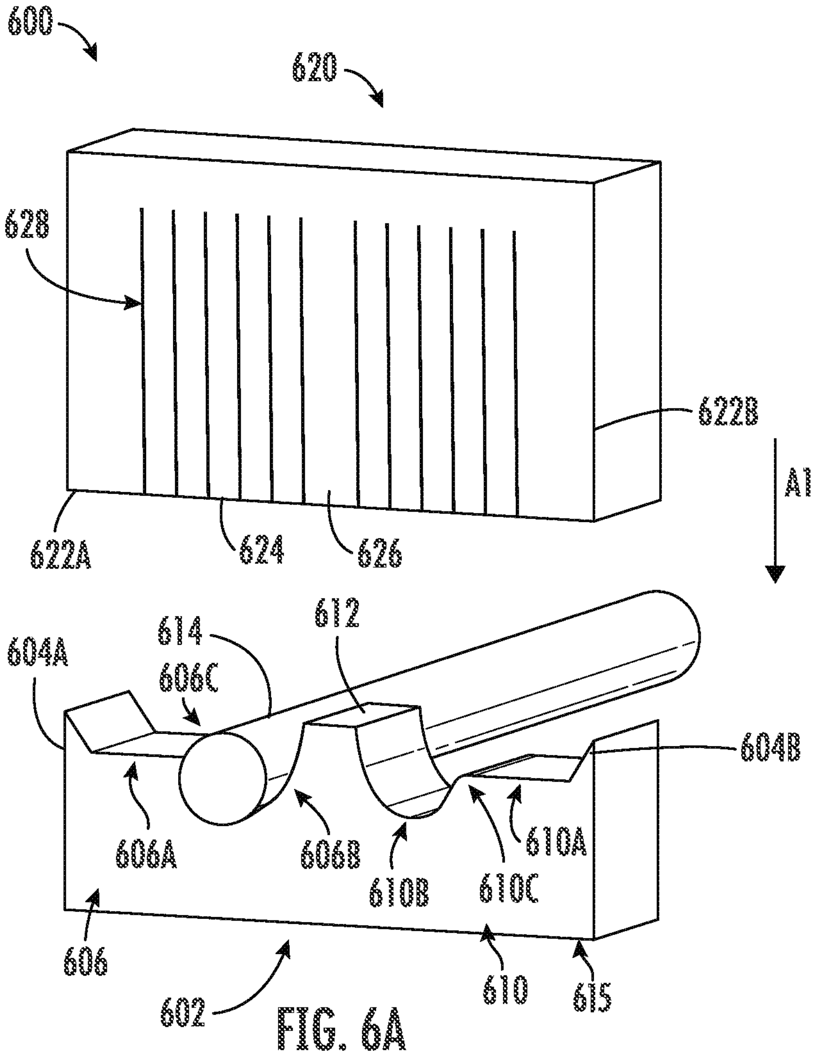
FIGS. 6A-6D are perspective views of the cable sealing device of FIG. 2A where a first cable is inserted into the first compressible member of the cable sealing device and the second compressible member is shifted towards the first compressible member (or vice-versa) so that compressible member and the second compressible member contact one another, whereby at least one of the fingers of the second compressible member are compressed and assist in sealing the first cable within the cable sealing device, in accordance with some embodiments discussed herein.

A second compressible member 620 may be shifted towards the first compressible member 602 and a cable 614 therein to generate compression between the two compressible members 602, 620, and the second compressible member 620 may deform in shape to better conform to the shape of the first compressible member 602 and the cable 614. Referring now to FIGS. 6A-6D, perspective views illustrating an example cable sealing device 600 similar to the cable sealing device 200 of FIG. 2A and a first cable 614 therein are shown, where the second compressible member 620 is shifted along direction A1 towards the first compressible member 602 so that fingers 624 in the second compressible member 620 are compressed and assist in sealing the first cable 614. The first compressible member 602 defines a surface 615, with the wall portion 612 and the grooves 606, 610 defined in the first compressible member 602 opposite the surface 615. In FIG. 6A, the first compressible member 602 is offset away from the second compressible member 620 and the first cable 614. The second compressible member 620 has a plurality of cuts 628 formed in the second compressible member 620 to define a first end finger 622A, a second end finger 622B, fingers 624, and an enlarged finger 626.

Figure 6B:
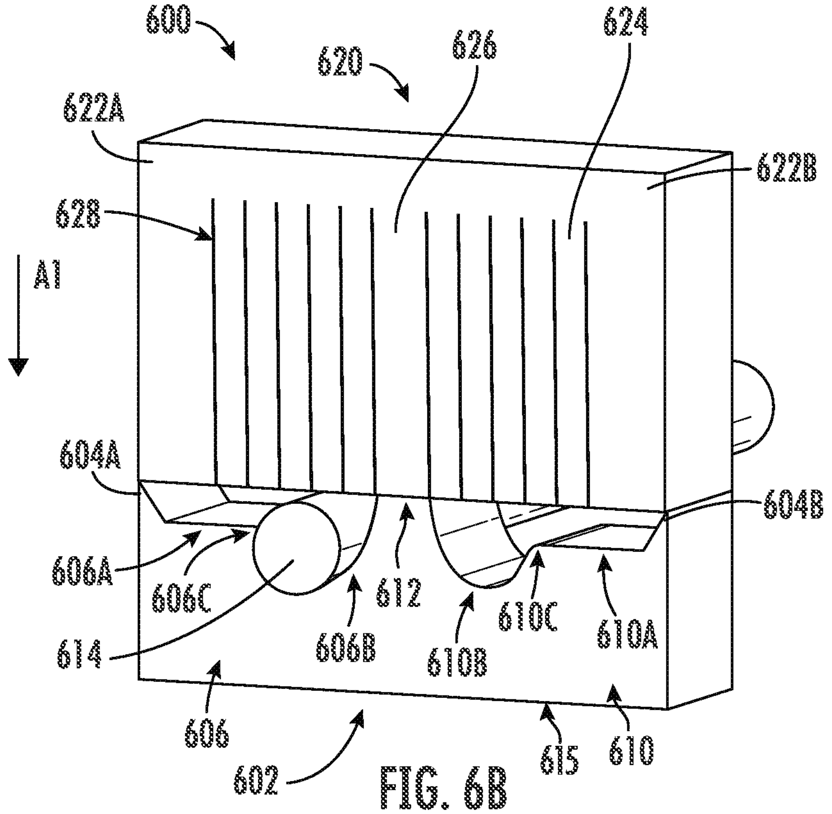

In FIG. 6B, the second compressible member 620 is moved along direction A1 such that the first compressible member 602 is in light contact with the second compressible member 620, but the first compressible member 602 and the second compressible member 620 have not been compressed in FIG. 6B. In FIG. 6B, a free end of the enlarged finger 626 is in contact with a top surface of the wall portion 612, the first end finger 622A is in contact with the first edge portion 604A, and the second end finger 622B is in contact with the second edge portion 604B. However, other portions of the second compressible member 620 such as the fingers 624 are not in contact with the first compressible member 602 or the first cable 614 in FIG. 6B. As the second compressible member 620 is urged further towards the first compressible member 602 beyond the relative positions illustrated in FIG. 6B, the second compressible member 620 and the first compressible member 602 may begin being compressed together to cause deformation in the second compressible member 620 and/or the first compressible member 602.

Figure 6C:
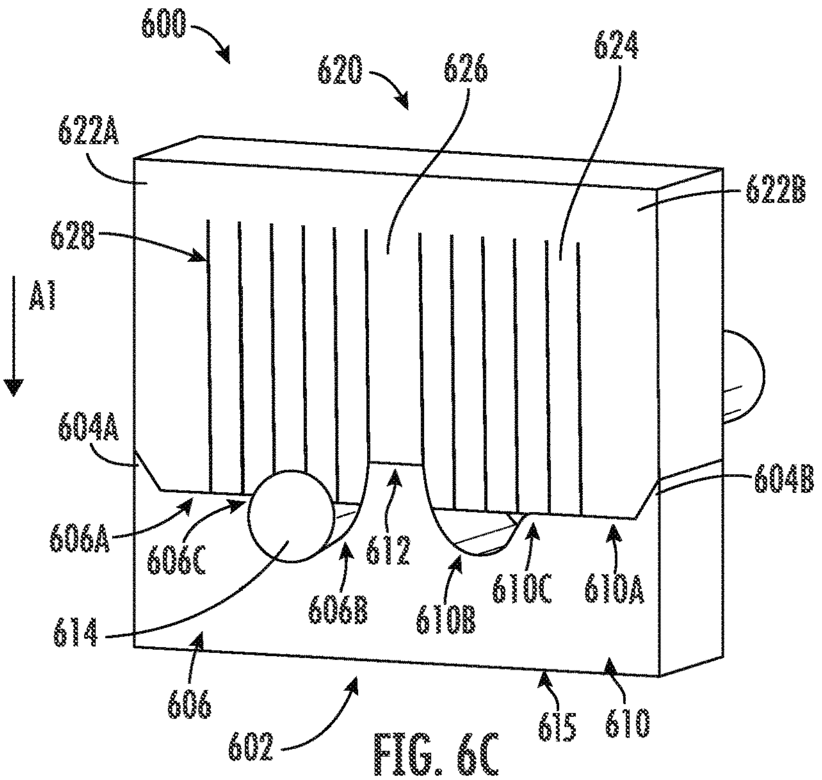

In FIG. 6C, the second compressible member 620 is urged further along direction A1 towards the first compressible member 602 so that the fingers 624 are in contact with the first straight portion 606A of the first groove 606, the second straight portion 610A of the second groove 610, and the first cable 614. As illustrated in FIG. 6C, the fingers 624 are compressed and conform to the shape of the first cable 614.

Figure 6D:
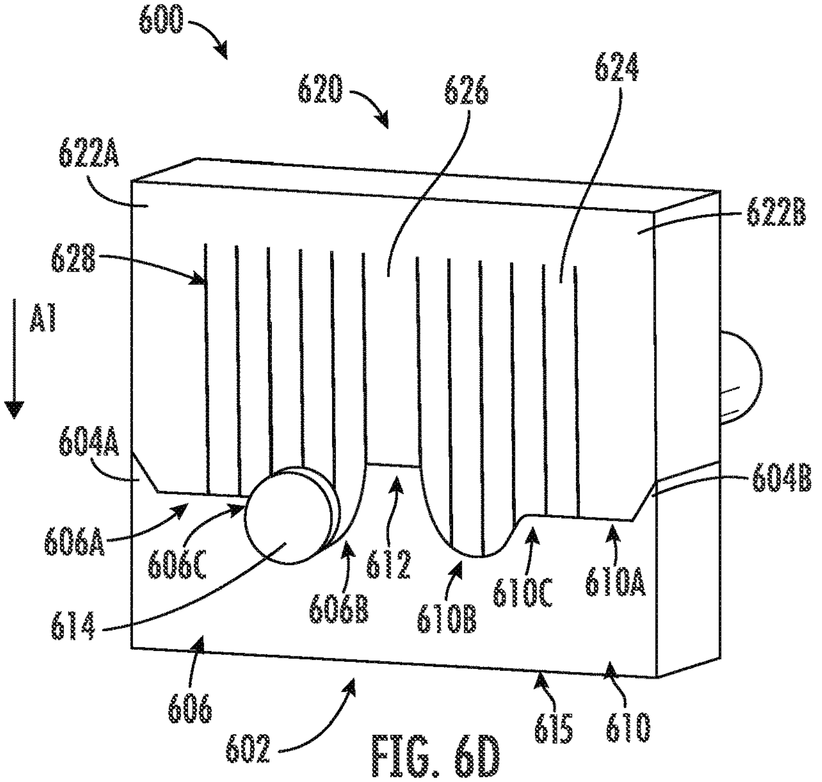

Furthermore, in FIG. 6D, the second compressible member 620 is urged further along direction A1 towards the first compressible member 602 so that fingers 624 are in contact with all portions of the second rounded portion 610B of the second groove 610 and the second transition portion 610C of the second groove 610. In FIG. 6D, one or more fingers 624 are in contact with a portion of the first transition portion 606C of the first groove 606, and fingers 624 are further compressed against the first cable 614. The fingers 624 may compress the first cable 614 into the first rounded portion 606B of the first groove 606. As the second compressible member 620 is urged further towards the first compressible member 602 (e.g., moving from the relative positions in FIG. 6B to the relative positions in FIG. 6D), the fingers 624 and other portions of the second compressible member 620 may deform in variable amounts so that the fingers 624 conform to the shape of the first compressible member 602 and the first cable 614. The fingers 624 may therefore restrict movement of the first cable 614 at least partially and may also form a seal around the first cable 614.

A second compressible member 720 may be shifted towards a first compressible member 702 and cables 714, 716 therein to generate compression between the two compressible members 702, 720, and the first compressible member 702 and the second compressible member 720 may deform in shape to better conform to the shape of the cables 714, 716. Referring now to FIGS. 7A-7D, perspective views illustrating an example cable sealing device 700 similar to the cable sealing device 200 of FIG. 2A and cables 714, 716 therein are shown, where the second compressible member 720 is shifted towards the first compressible member 702 so that fingers 724 in the second compressible member 720 are compressed and assist in sealing the cables 714, 716. The first compressible member 702 defines a surface 715, with the wall portion 712 and the grooves 706, 710 defined in the first compressible member 702 opposite the surface 715. The first cable 714 and the second cable 716 have two different cross-sectional sizes. In the illustrated embodiment, both cables 714, 716 have circular cross-sections, and the second cable 716 has a larger radius than the first cable 714.

Figure 7A:
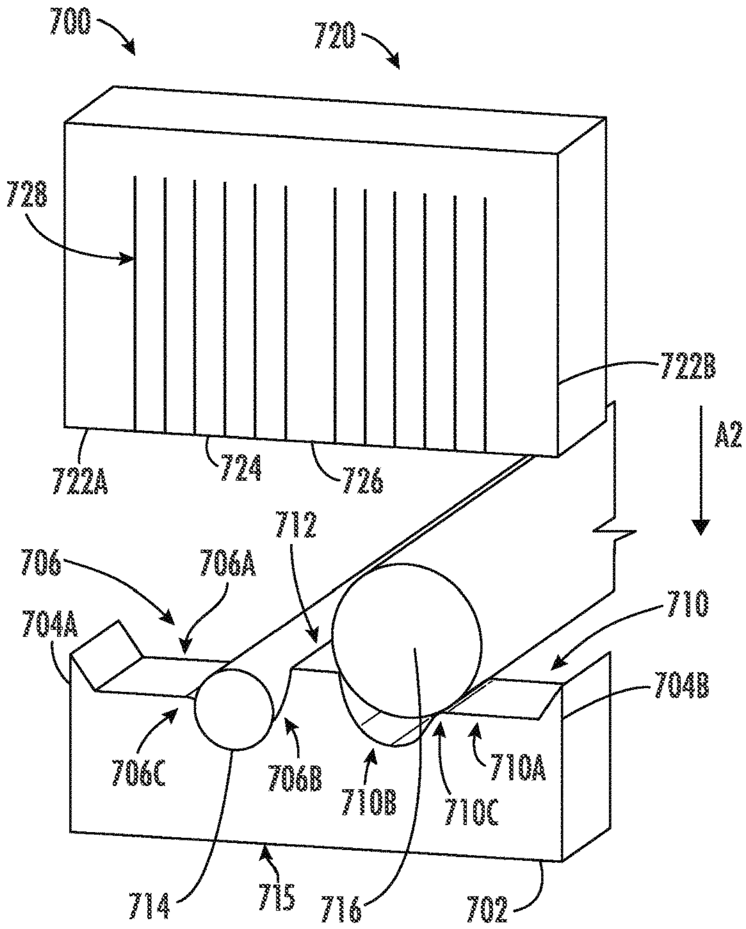
FIGS. 7A-7D are perspective views of the cable sealing device of FIG. 2A where a first cable and a second cable are inserted into the cable sealing device and where the second compressible member is shifted towards the first compressible member (or vice versa) so that the first compressible member and the second compressible member contact one another, whereby at least one of the fingers of the second compressible member are compressed and assist in sealing the first and second cables, in accordance with some embodiments discussed herein.

In FIG. 7A, the first compressible member 702 is offset away from the second compressible member 720 and the cables 714, 716. Where the radius of a cable is less than or equal to a radius of the first or second rounded portion, the first compressible member 702 may be configured to allow the cable to simply rest in the respective rounded portion without any deflection in the adjacent straight portion and/or transition portion. For example, in FIG. 7A, the radius of the first cable 714 is less than the minimum radius of the first rounded portion 706B of the first groove 706, and the first cable 714 is therefore permitted to rest in the first rounded portion 706B without extending to or causing deflection at the first straight portion 706A of the first groove 706 and/or the first transition portion 706C of the first groove 706.

Figure 7B:
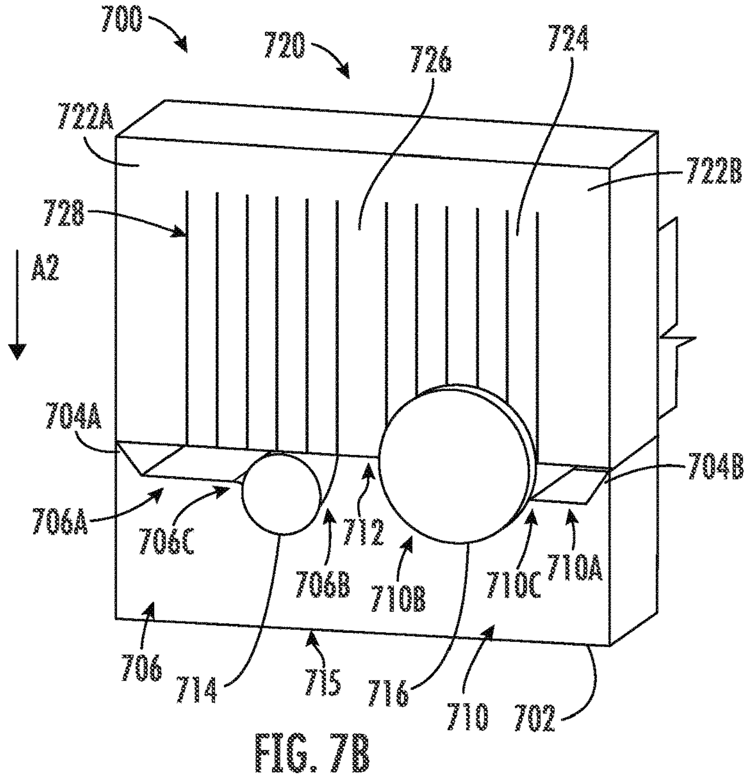
Figure 7C:
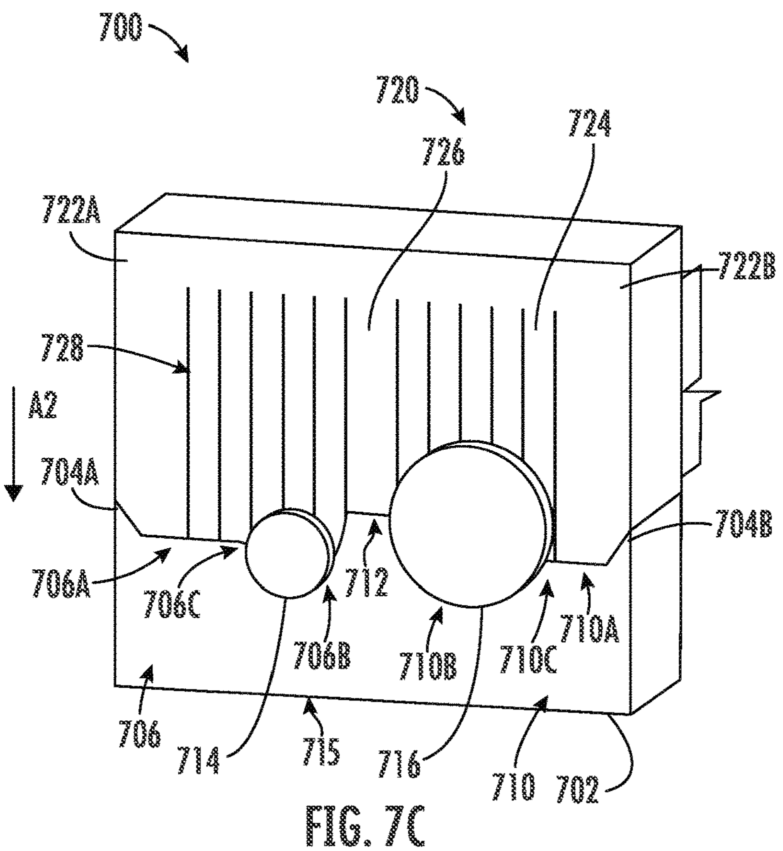
Figure 7D:
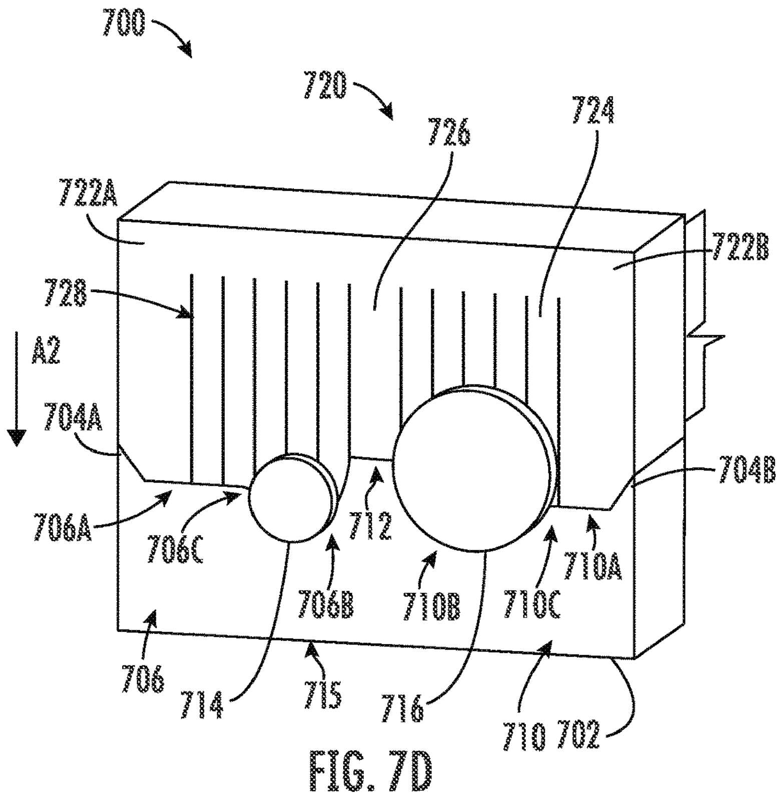

By contrast, when the radius of a cable is greater than a radius of a rounded portion, the cable will not fit in the rounded portion (without any deflection), and the first compressible member 702 may therefore be configured to deflect at the straight portion and/or transition portion of a groove so that the first compressible member 702 may be received in the groove. This deflection may increase as the first compressible member 702 and the second compressible member 720 are compressed more tightly together. For example, in FIG. 7A, the radius of the second cable 716 is greater than the minimum radius of the second rounded portion 710B of the second groove 710, so the second cable 716 will not fit in the second rounded portion 710B unless deflection is caused in the first compressible member 702. In FIG. 7A, where no force is acting on the second cable 716 (other than gravity), a gap may be formed between most of the surface area of the second rounded portion 710B of the second groove 710 and the second cable 716. With reference to FIGS. 7B-7D, the second straight portion 710A of the second groove 710 and the second transition portion 710C of the second groove 710 may deflect in increased amounts as the compression applied between the first compressible member 702 and the second compressible member 720 is increased, allowing the second cable 716 to come into contact with a greater surface area of the first compressible member 702. The second compressible member 720 has a plurality of cuts 728 formed in the second compressible member 720 to define a first end finger 722A, a second end finger 722B, fingers 724, and an enlarged finger 726.

In FIG. 7B, the second compressible member 720 is moved along direction A2 such that the first compressible member 702 is in light contact with the second compressible member 720, and the first compressible member 702 is not yet in contact with the first cable 714. However, in FIG. 7B, the fingers 724 of the second compressible member 720 are already being compressed against the second cable 716 due to the larger cross-sectional size of the second cable 716. As the second compressible member 720 is urged along direction A2, this may result in a force acting on the second cable 716 that tends to push the second cable 716 into the first compressible member 702, causing deformation in the shape of the first compressible member 702 at the second transition portion 710C and at the second straight portion 710A. In FIG. 7B, a free end of the enlarged finger 726 is in contact with a surface of the wall portion 712, the first end finger 722A is in contact with the first edge portion 704A, and the second end finger 722B is in contact with the second edge portion 704B. However, other portions of the second compressible member 720 such as the fingers 724 that are located above the first groove 706A are not in contact with the first compressible member 702 or the first cable 714 in FIG. 7B.

In FIGS. 7C and 7D, the second compressible member 720 is urged further along direction A2 towards the first compressible member 702 so that the fingers 724 are in contact with the first straight portion 706A and the first cable 714. Additionally, in FIG. 7C, the fingers 724 are compressed even more against the second cable 716, ensuring effective positioning and an effective seal for the second cable 716. The compression caused on the second cable 716 may generate a force acting on the first compressible member 702, resulting in further deformation of the second transition portion 710C and at the second straight portion 710A.

As the second compressible member 720 is urged further along direction A2 towards the first compressible member 702 (e.g., moving from the relative positions in FIG. 7B to the relative positions in FIG. 7D), the fingers 724 and other portions of the second compressible member 720 may deform in variable amounts so that the fingers 724 conform to the shape of the first compressible member 702, the first cable 714, and the second cable 716. Despite the difference in sizes in the first cable 714 and the second cable 716, the fingers 724 may restrict movement of the first cable 714 and the second cable 716 at least partially and may also form a seal around the first cable 714 and second cable 716. Additionally, deformation at the second transition portion 710C and at the second straight portion 710A may enable an increased amount of surface area contact between the first compressible member 702 and the second cable 716, and this deformation may also assist in effectively restricting movement of the second cable 716 at least partially and forming an effective seal at the second cable 716.

Figure 8A:
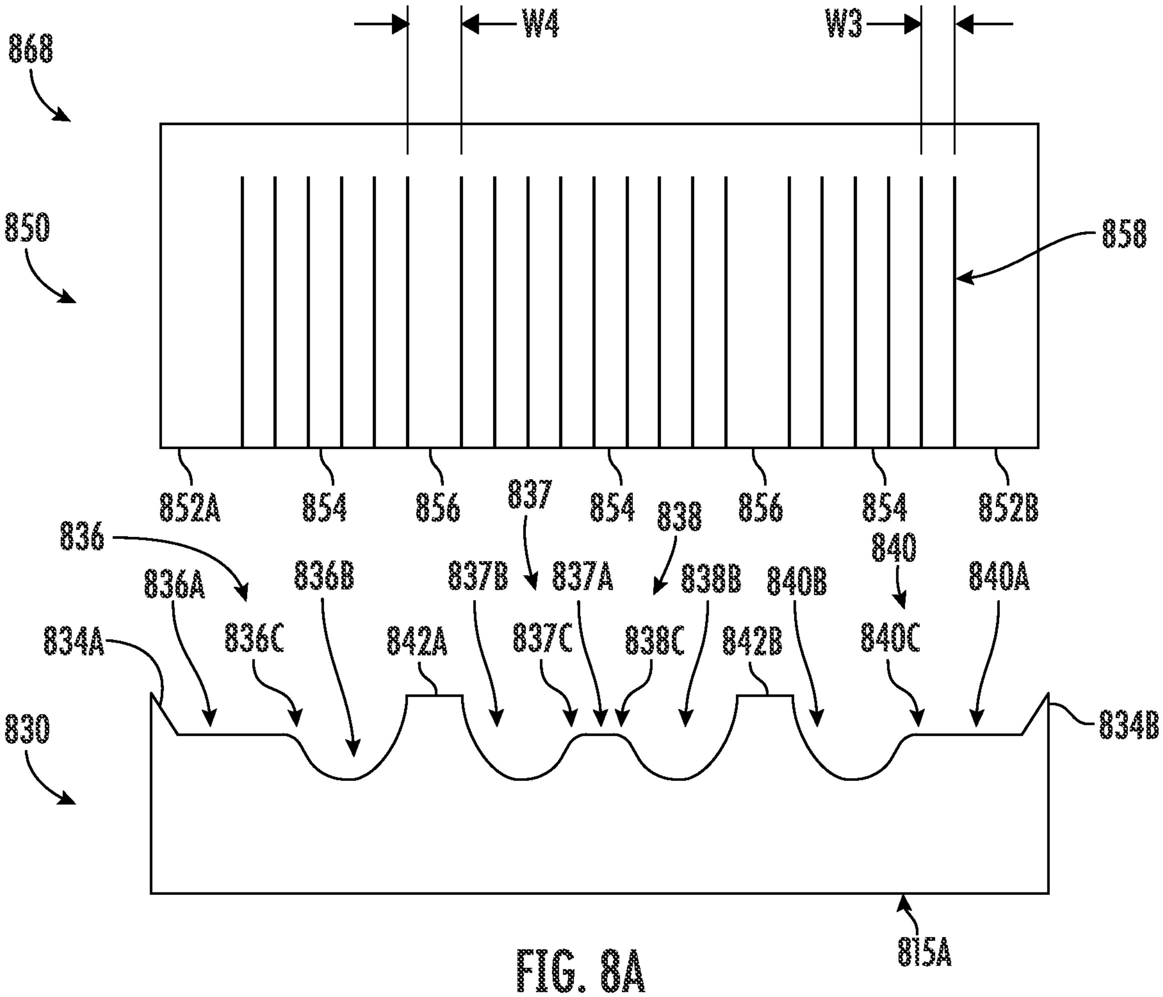
FIG. 8A is a front view of an alternative embodiment of the cable sealing device of FIG. 2A that is configured to receive multiple cables, in accordance with some embodiments discussed herein.

In some embodiments, cable sealing devices 868 may be utilized that are configured to receive more than two cables. FIG. 8A is a front view illustrating an example cable scaling device 868 that is configured to receive multiple cables. The cable sealing device 868 may be configured to receive four cables in some embodiments. The cable sealing device 868 may beneficially ensure appropriate positioning, tightness and scaling of cables after applying compression in various situations. For example, this may be ensured even where a cable scaling device 868 is used (i) without cables; (ii) with only one cable at a minimum diameter; (iii) with only one cable at a maximum diameter; (iv) with two or more cables having the same diameter; and (v) with two or more cables having different diameters.

As illustrated, the first compressible member 830 has four grooves defined therein. The first compressible member 830 defines a surface 815A, with any wall portions and any grooves defined in the first compressible member 830 opposite the surface 815A. A first groove 836 comprises a first straight portion 836A, a first transition portion 836C, and a first rounded portion 836B. The first compressible member 830 may be configured to receive a cable in the first groove 836. A second groove 837 comprises a second straight portion 837A, a second transition portion 837C, and a second rounded portion 837B, and the first compressible member 830 may be configured to receive a cable in the second groove 837. A third groove 838 comprises the second straight portion 837A, a third transition portion 838C, and a third rounded portion 838B, and the first compressible member 830 may be configured to receive a cable in the third groove 838. A fourth groove 840 comprises a third straight portion 840A, a fourth transition portion 840C, and a fourth rounded portion 840B, and the first compressible member 830 may be configured to receive a cable in the fourth groove 840. Where cables are received in each of the grooves 836, 837, 838, 840, cables having smaller cross-sectional sizes may be provided in groove 837 and groove 838, and cables having larger cross-sectional sizes may be provided in groove 836 and groove 840.

The first compressible member 830 has a first wall portion 842A and a second wall portion 842B. The first wall portion 842A separates the first groove 836 on the left from the second groove 837 and the third groove 838 in the middle, and the first wall portion 842A may provide tightness between cables in grooves 836, 837, 838. The second groove 837 and third groove 838 are provided in the middle between the first wall portion 842A and the second wall portion 842B. The second wall portion 842B also separates the fourth groove 840 on the right from the second groove 837 and the third groove 838 in the middle, and the second wall portion 842B may provide tightness between cables in the grooves 837, 838, 840.

Additionally, edge portions 834A, 834B may be provided in the first compressible member 830 at each end of the first compressible member 830. For example, in FIG. 8A, the first compressible member 830 defines a first end (towards the left in FIG. 8A) and a second end (towards the right in FIG. 8A). A first edge portion 834A is positioned at the first end, and a second edge portion 834B is positioned at the second end.

Referring now to FIG. 8A, the example second compressible member 850 of the cable sealing device 868 is shown. The second compressible member 850 comprises a plurality of fingers 854, with each of the fingers 854 defining a width (W3) in a direction extending from the first end finger 852A to the second end finger 852B. In some embodiments, the width (W3) may be less than or equal to one-third of a minimum cable diameter that the cable sealing device 868 is recommended for use with. This may enable at least three different fingers 854 to be compressed against a cable, and this may be beneficial to enable fingers 854 to deform in differing amounts so that the fingers 854 may better conform to the shape of the cable. Additionally, the width (W3) may be greater than or equal to one-fifth of a maximum cable diameter that the cable sealing device is recommended for use with. However, in other embodiments, the width (W3) may possess larger or smaller values to enable a lesser or greater number of fingers 854 to contact a cables. The fingers 854 are capable of deforming in different amounts to conform to the shape of cables and to conform to the shape of the first compressible member 830.

Furthermore, the second compressible member 850 further comprises enlarged fingers 856. These enlarged fingers 856 define a width (W4) in a direction extending from the first end finger 852A to the second end finger 852B. The width (W4) is greater than the width (W3). In some embodiments, the width (W4) may match the width of a surface of the wall portions 842A, 842B that is formed in the first compressible member 830, and the second compressible member 850 may be urged towards the first compressible member 830 so that free ends of the enlarged fingers 856 contact surfaces of the wall portions 842A, 842B. The enlarged finger 856 is capable of deforming in different amounts relative to the other fingers 852A, 852B, 854 to allow the second compressible member 850 to conform to the shape of cables and to conform to the shape of the first compressible member 830). At least one finger 854, 856 of the second compressible member 850 may deform as the second compressible member 850 is compressed, allowing the fingers 854, 856 to restrict movement of the cables received in grooves of the first compressible member 830 at least partially and form a seal around the cables.

Additionally, the second compressible member 850 also includes a first end finger 852A positioned on one end of the second compressible member 850 and a second end finger 852B positioned on a second end of the second compressible member 850. The first end finger 852A and the second end finger 852B have a width that is greater than each of the width (W3) and the width (W4) of the plurality of fingers 854 and the enlarged fingers 856 respectively. However, it is within the scope of the present disclosure that other widths may be utilized for end fingers 852A, 852B. Each of the fingers 852A, 852B, 854, 856 are integrally formed with the second compressible member 850 on one side of the second compressible member 850 with free-ends that extend to another side of the second compressible member 850 (e.g., the bottom side in FIG. 8A).

A plurality of cuts 858 are formed in the second compressible member 850 to define fingers 852A, 852B, 854, 856. A respective cut 858 is positioned between adjacent fingers 854, 856 of the plurality of fingers 854, 856. Cuts 858 may enable the second compressible member 850 to have a more precise fit than other devices without these cuts, and cuts 858 may enable the second compressible member 850 to have a more precise fit where two or more cables of different sizes are used.

In FIG. 8A, the end faces of the free-ends of fingers 852A, 852B, 854, 856 rest in the same plane. However, in some embodiments, the end faces of the free-ends of the fingers 852A, 852B, 854, 856 may not rest in the same plane. For example, the enlarged finger 856 may be shorter than the other fingers so that the end face of the free-end of the enlarged finger 856 may be offset from the end faces of the other fingers. This may be beneficial to appropriately position a wall portion 842A, 842B relative to an enlarged finger 856, which in turn, positions the first compressible member 830 relative to the second compressible member 850 appropriately.

In some embodiments, a compression member in the form of the second compressible member 850 may be used independently and without the first compressible member 830, and the compression member 850 may be urged towards one or more objects (e.g., one or more cables) so that the fingers 852A, 852B, 854, 856 of the compression member 850 deform as the compression member 850 is urged towards the object(s). The fingers 852A, 852B, 854, 856 may at least partially restrict movement of the object(s) and at least partially forms a seal around the more object(s). However, the compression member 850 may possess other geometries such as the geometry of the second member 220 illustrated in FIG. 2B, the geometry of the second member 882 illustrated in FIG. 8B, or another geometry.

Figure 8B:
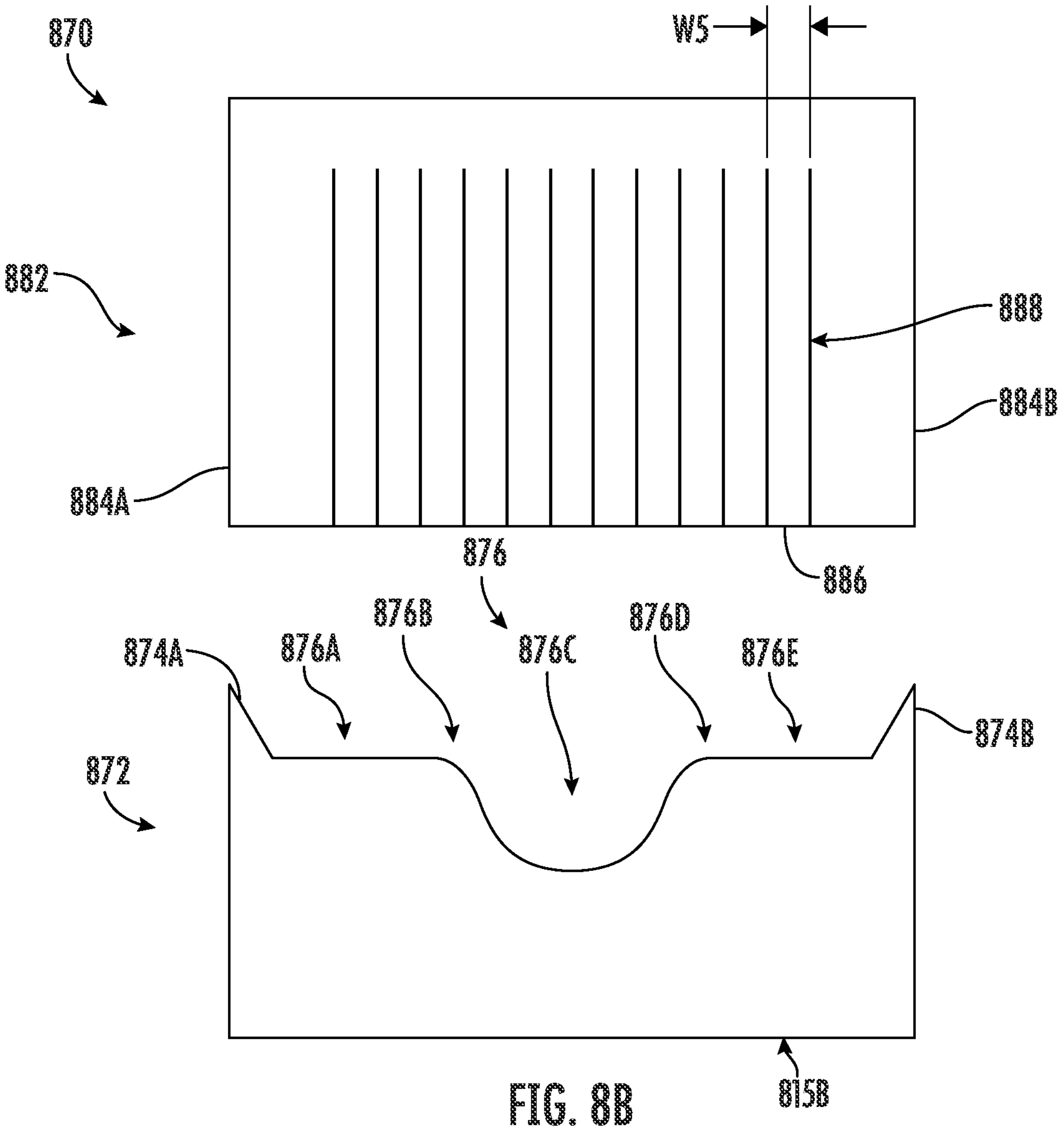
FIG. 8B is a front view of an alternative embodiment of the cable sealing device of FIG. 2A that is configured to receive one cable, in accordance with some embodiments discussed herein.

In some embodiments, cable sealing devices may be utilized that are configured to receive only one cable. FIG. 8B is a front view illustrating another example cable sealing device 870 that is configured to receive only one cable.

As illustrated, the first compressible member 872 also has only one groove 876 defined therein, and the first compressible member 872 does not have any wall portion. In the first compressible member 872, the groove 876 comprises a first straight portion 876A, a first transition portion 876B, a first rounded portion 876C, a second transition portion 876D, and second straight portion 876E. The first compressible member 872 defines a surface 815B, and the groove 876 is defined in the first compressible member 872 opposite the surface 815B.

Additionally, edge portions 874A, 874B may be provided in the first compressible member 872 at each end of the first compressible member 872. For example, in FIG. 8B, the first compressible member 872 defines a first end (towards the left in FIG. 8A) and a second end (towards the right in FIG. 8B). A first edge portion 874A is positioned at the first end, and a second edge portion 874B is positioned at the second end.

Referring now to FIG. 8B, an example second compressible member 882 of the cable sealing device 870 is shown. The second compressible member 882 comprises a plurality of fingers 886, a first end finger 884A, and a second end finger 884B. As shown and discussed in greater detail herein, there can be variability in widths among the plurality of fingers 886. In the illustrated embodiment, each of the fingers 886 define a width (W5) in a direction extending from the first end finger 884A to the second end finger 884B. In some embodiments, the width (W5) may be less than or equal to one-third of a minimum cable diameter that the cable sealing device is recommended for use with. This may enable at least three different fingers 886 to be compressed against a small cable, which may be beneficial to enable fingers to deform in differing amounts so that the fingers may better conform to the shape of the cable. Additionally, the width (W5) may be greater than or equal to one-fifth of a maximum cable diameter that the cable sealing device is recommended for use with. However, in other embodiments, the width (W5) may possess larger or smaller values to enable a lesser or greater number of fingers 886 to contact a cable. The fingers 886 are capable of deforming in different amounts to conform to the shape of a cable and to conform to the shape of the first compressible member 872. At least one finger 886 of the second compressible member 882 may deform as the second compressible member 882 is compressed, allowing the finger(s) 886 to restrict movement of the cable at least partially and to form a seal around the cable.

Additionally, as mentioned previously, the second compressible member 882 further includes a first end finger 884A provided on one end of the second compressible member 882 and a second end finger 884B provided on a second end of the second compressible member 882. The first end finger 884A and the second end finger 884B both have a width that is greater than the width (W5) of the fingers 886. However, it is within the scope of the present disclosure that other widths may be utilized for end fingers 884A, 884B. Each of the fingers 884A, 884B, 886 are integrally formed with the second compressible member 882 on one side of the second compressible member 882 with free-ends that extend to one side of the second compressible member 882 (e.g., the bottom side in FIG. 8B).

A plurality of cuts 888 are formed in the second compressible member 882 to define fingers 884A, 884B, 886. A respective cut 888 is, for example, positioned between adjacent fingers 884A, 884B, 886. Cuts 888 may enable the second compressible member 882 to have a more precise fit than other devices without these cuts, and cuts 888 may enable the second compressible member 882 to have a more precise fit.

In some embodiments, a compression member in the form of the second compressible member 882 may be used independently and without the first member 872, and the compression member 882 may be urged towards one or more objects (e.g., one or more cables) so that the fingers 884A, 884B, 886 of the compression member 882 deform as the compression member 882 is urged towards the object(s). The fingers 884A, 884B, 886 may at least partially restrict movement of the object(s) and at least partially forms a seal around the more object(s). However, the compression member 882 may possess other geometries such as the geometry of the second compressible member 220 illustrated in FIG. 2B, the geometry of the second compressible member 850 illustrated in FIG. 8A, or another geometry.

Figure 9:
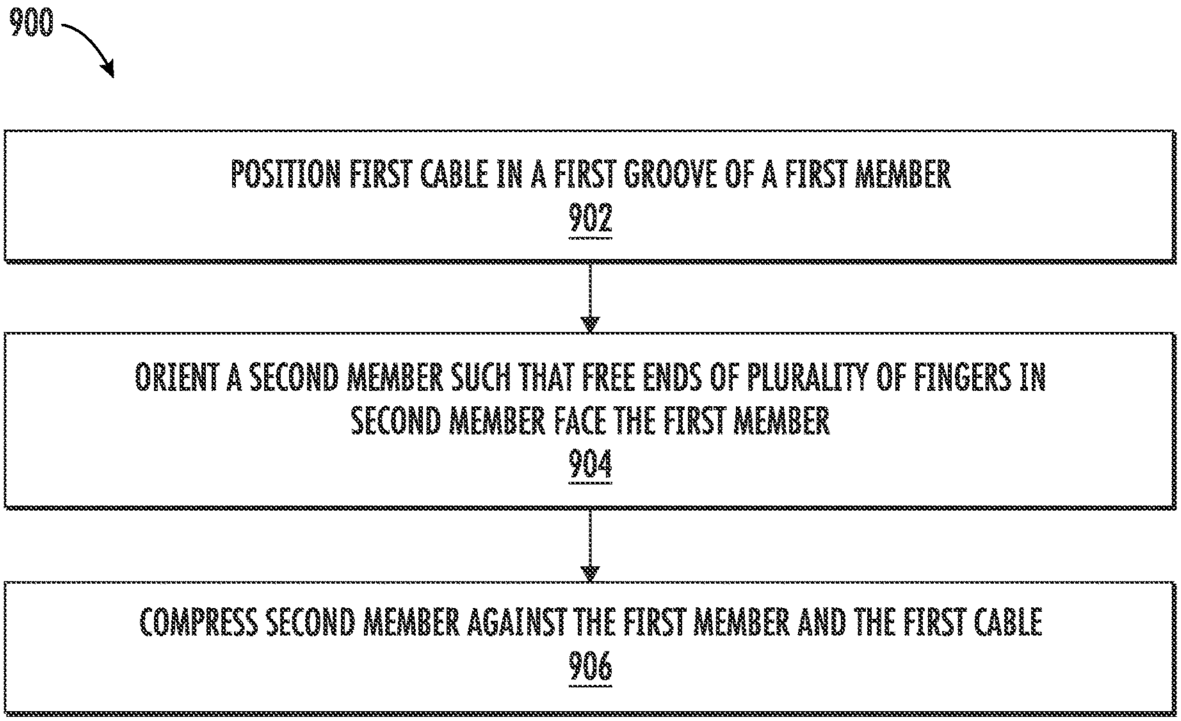
FIG. 9 is a flow chart illustrating an example method of forming a seal around one or more cables, in accordance with some embodiments discussed herein.

Methods of forming a seal around cable(s) are also contemplated, and FIG. 9 is a flow chart illustrating an example method 900 of forming a seal around one or more cables. At operation 902, a first cable is positioned in a first groove of a first compressible member. The first compressible member may define a wall portion and the first groove. The first groove may possess a first rounded portion, a first transition portion, and first straight portion. A minimum depth of the first rounded portion may be less than a depth of the first straight portion, and the depth of the first straight portion may be less than a depth of the wall portion.

In some embodiments, a second cable may be received in a second groove of the first compressible member at operation 902. For example, the first compressible member may define a wall portion, the first groove, and the second groove, with the wall portion separating the two grooves. Additionally, the second groove may possess a second rounded portion, a second transition portion, and a second straight portion. A minimum depth of the second rounded portion may be less than a depth of the second straight portion, and the depth of the second straight portion may be less than a depth of the wall portion. In some embodiments, the first cross-sectional size of the first cable (e.g., the radius of the first cable) may be different from the second cross-sectional size (e.g., the radius of the second cable).

At operation 904, a second compressible member is oriented such that free ends of fingers in the second compressible member face the first compressible member. The second compressible member may comprise the fingers. The fingers may be attached together on one side of the second compressible member and may have free ends on an opposing side of the second compressible member. Cuts may be formed in the second compressible member, and a respective cut may be positioned between adjacent fingers of the plurality of fingers.

At operation 906, the second compressible member is compressed against the first compressible member and the first cable. As this compression occurs, at least one finger of the second compressible member may deform, and the fingers may at least partially restrict movement of the first cable and form a seal around the first cable. Where a second cable is included, the finger(s) of the second compressible member may deform and restrict movement of the second cable at least partially and form a seal around the second cable.

The first compressible member may comprise a first foam material that is configured to deform elastically, and the second compressible member may comprise a second foam material that is configured to deform elastically. In some embodiments, an identical amount of compression may result in greater amounts of deformation in the second foam material as compared to the first foam material. In some embodiments, the density of the first foam material and the second foam material may be different.

CONCLUSION

Many modifications and other embodiments set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A system for sealing one or more optical fiber cables, the system comprising:

a first compressible member defining a first surface, wherein a wall portion and a first groove are defined in the first compressible member opposite the first surface, wherein the first groove comprises a first rounded portion and a first straight portion, wherein a minimum depth of the first rounded portion from the first surface is less than a depth of the first straight portion from the first surface, wherein the depth of the first straight portion from the first surface is less than a depth of the wall portion from the first surface, and wherein the first compressible member is configured to receive a first cable of the one or more cables in the first groove; and a second compressible member comprising a plurality of fingers, wherein a plurality of cuts are formed in the second compressible member, wherein a respective cut is positioned between adjacent fingers of the plurality of fingers, and wherein the plurality of fingers are attached together on one side of the second compressible member, wherein at least one finger of the plurality of fingers of the second compressible member deforms as the second compressible member is compressed, and wherein the plurality of fingers are configured for at least partially restricting movement of the first cable and for forming a seal around the first cable between the first compressible member and the second compressible member.

2. The system of claim 1, wherein a second groove is defined in the first compressible member opposite the first surface, wherein the second groove comprises a second rounded portion and a second straight portion, wherein a minimum depth of the second rounded portion from the first surface is less than a depth of the second straight portion from the first surface, wherein the depth of the second straight portion from the first surface is less than the depth of the wall portion from the first surface, wherein the first compressible member is configured to receive a second cable of the one or more cables in the second groove, and wherein the plurality of fingers are configured for at least partially restricting movement of the second cable and for forming a seal around the second cable between the first compressible member and the second compressible member.

3. The system of claim 2, wherein the first cable has a first cross-sectional size, wherein the second cable has a second cross-sectional size, and wherein the first cross-sectional size is different from the second cross-sectional size.

4. The system of claim 2, wherein a third groove is defined in the first compressible member, wherein the first compressible member is configured to receive a third cable of the one or more cables in the third groove, and wherein the plurality of fingers are configured for at least partially restricting movement of the third cable and for forming a seal around the third cable.

5. The system of claim 4, wherein a fourth groove is defined in the first compressible member, wherein the first compressible member is configured to receive a fourth cable of the one or more cables in the fourth groove, and wherein the plurality of fingers are configured for at least partially restricting movement of the fourth cable and for forming a seal around the fourth cable.

6. The system of claim 1, wherein the first groove is configured to receive a cable in the first rounded portion when a radius of the cable is less than or equal to a radius of the first rounded portion.

7. The system of claim 6, wherein the first groove is configured to receive the cable in the first rounded portion without any deflection in the first straight portion when the radius of the cable is less than or equal to the radius of the first rounded portion.

8. The system of claim 1, wherein the first straight portion is configured to deflect when the radius of the cable is greater than a radius of the first rounded portion.

9. The system claim 1, wherein a first finger of the plurality of fingers defines a first width, and wherein the first width is less than or equal to one-third of a minimum cable diameter.

10. The system of claim 9, wherein the first width is greater than or equal to one-fifth of a maximum cable diameter.

11. The system of claim 9, wherein a second finger of the plurality of fingers defines a second width, and wherein the second width is greater than the first width.

12. The system of claim 11, wherein the wall portion is formed in the first compressible member between the first groove and the second groove, and wherein the second compressible member is configured to be urged towards the first compressible member so that a free end of the second finger contacts a second surface of the wall portion.

13. The system of claim 1, wherein the first compressible member defines a first end and a second end, wherein a first edge portion is positioned at the first end, wherein a second edge portion is positioned at the second end, and wherein the depth of the first straight portion from the first surface is less than a depth of the first edge portion from the first surface and a depth of the second edge portion from the first surface.

14. The system of claim 1, wherein the first compressible member comprises a first foam material that is configured to deform elastically, wherein the second compressible member comprises a second foam material that is configured to deform elastically, and wherein an identical amount of compression results in greater amounts of deformation in the second foam material as compared to the first foam material.

15. The system of claim 1, wherein the plurality of fingers comprises a first finger and a second finger, and wherein the first finger and the second finger are capable of deforming in different amounts to conform to the shape of the cable and to conform to the shape of the first compressible member.

16. A system for sealing one or more optical fiber cables, the system comprising:

a first compressible member defining a first surface, wherein a wall portion and a first groove are defined in the first compressible member opposite the first surface, wherein the first groove comprises a first rounded portion and a second portion, wherein a minimum depth of the first rounded portion from the first surface is less than a depth of the second straight portion from the first surface, wherein the depth of the second portion from the first surface is less than a depth of the wall portion from the first surface, and wherein the first compressible member is configured to receive a first cable of the one or more cables in the first groove;

a second compressible member comprising a plurality of fingers, wherein a plurality of cuts are formed in the second compressible member, wherein a respective cut is positioned between adjacent fingers of the plurality of fingers, and wherein the plurality of fingers are attached together on one side of the second compressible member; and an enclosure comprising a wall, wherein the wall defines an opening therein, wherein the first cable is configured to be received so that the first cable extends through the opening of the enclosure, wherein the first compressible member and the second compressible member are positioned at the opening of the enclosure, wherein at least one finger of the plurality of fingers of the second compressible member deforms as the second compressible member is compressed, and wherein the plurality of fingers are configured for at least partially restricting movement of the first cable and for forming a seal around the first cable between the first compressible member and the second compressible member.

17. The system of claim 16, further comprising:

one or more springs, wherein the one or more springs are attached to the second compressible member, and wherein the second compressible member is in contact with the first compressible member when the one or more springs are in their resting position.

18. The system of claim 16, wherein the first compressible member does not comprise a plurality of fingers.

19. A method for forming a seal around one or more optical fiber cables, the method comprising:

positioning a first cable of the one or more cables in a first groove of a first compressible member that defines a first surface, wherein the first compressible member defines a wall portion and the first groove, wherein the first groove comprises a first rounded portion and a first straight portion, wherein a minimum depth of the first rounded portion from the first surface is less than a depth of the first straight portion from the first surface, wherein the depth of the first straight portion from the first surface is less than a depth of the wall portion from the first surface;

orienting a second compressible member such that free ends of a plurality of fingers in the second compressible member face the first compressible member, wherein the second compressible member comprises the plurality of fingers, wherein the plurality of fingers are attached together on one side of the second compressible member and have free ends on an opposing side of the second compressible member, wherein a plurality of cuts are formed in the second compressible member, and wherein a respective cut is positioned between adjacent fingers of the plurality of fingers; and compressing the second compressible member against the first compressible member and the first cable, wherein at least one finger of the plurality of fingers of the second compressible member deforms as the second compressible member is compressed, and wherein the plurality of fingers at least partially restrict movement of the first cable and form a seal around the first cable between the first compressible member and the second compressible member.

20. The method of claim 19, wherein the first compressible member defines a second groove comprising a second rounded portion and a second straight portion, wherein a minimum depth of the second rounded portion from the first surface is less than a depth of the second straight portion from the first surface, wherein the depth of the second straight portion from the first surface is less than the depth of the wall portion from the first surface, wherein the method further comprises positioning a second cable of the one or more cables in the second groove, wherein at least one finger at least partially restrict movement of the second cable and form a seal around the second cable, wherein the first cable has a first cross-sectional size and wherein the second cable has a second cross-sectional size, and wherein the first cross-sectional size is different from the second cross-sectional size.

21. The method of claim 20, wherein the first compressible member comprises a first foam material that is configured to deform elastically, wherein the second compressible member comprises a second foam material that is configured to deform elastically, and wherein an identical amount of compression results in greater amounts of deformation in the second foam material as compared to the first foam material.

22. The method of claim 19, wherein the first compressible member does not comprise a plurality of fingers.

23. A system for sealing one or more cables, the system comprising:

a first compressible member defining a first surface, wherein a wall portion and a first groove are defined in the first compressible member opposite the first surface, wherein the first groove comprises a first rounded portion and a second portion, wherein a minimum depth of the first rounded portion from the first surface is less than a depth of the second straight portion from the first surface, wherein the depth of the second portion from the first surface is less than a depth of the wall portion from the first surface, and wherein the first compressible member is configured to receive a first cable of the one or more cables in the first groove;

a second compressible member comprising a plurality of fingers, wherein a plurality of cuts are formed in the second compressible member, wherein a respective cut is positioned between adjacent fingers of the plurality of fingers, and wherein the plurality of fingers are attached together on one side of the second compressible member;

one or more springs, wherein the one or more springs are attached to the second compressible member, and wherein the second compressible member is in contact with the first compressible member when the one or more springs are in their resting position; and an enclosure comprising a wall, wherein the wall defines an opening therein, wherein the first cable is configured to be received so that the first cable extends through the opening of the enclosure, wherein the first compressible member and the second compressible member are positioned at the opening of the enclosure, wherein at least one finger of the plurality of fingers of the second compressible member deforms as the second compressible member is compressed, and wherein the plurality of fingers are configured for at least partially restricting movement of the first cable and for forming a seal around the first cable between the first compressible member and the second compressible member.

24. The system of claim 1, wherein the wall portion is adjacent to the first groove.

* * * * *